US008120819B2

(12) United States Patent  (10) Patent No.: US 8,120,819 B2
Hirokawa et al.  (45) Date of Patent: Feb. 21, 2012

(54) IMAGE PROCESSING DEVICE AND IMAGE FORMING DEVICE FOR GENERATING CORRECTED IMAGE DATA FOR A SOURCE IMAGE ACCORDING TO ABSORPTION WAVELENGTH CHARACTERISTICS OF INVISIBLE COLORING MATERIAL

(75) Inventors: Kazuhiko Hirokawa, Kanagawa (JP); Makoto Furuki, Kanagawa (JP); Kazunori Anazawa, Kanagawa (JP); Tomoko Miyahara, Kanagawa (JP); Minquan Tian, Kanagawa (JP); Shinji Hasegawa, Kanagawa (JP); Takashi Matsubara, Kanagawa (JP); Yuka Ito, Kanagawa (JP); Miho Watanabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 369 days.

(21) Appl. No.: 12/392,717

(22) Filed: Feb. 25, 2009

(65) Prior Publication Data
US 2009/0237756 A1  Sep. 24, 2009

(30) Foreign Application Priority Data

Mar. 19, 2008 (JP) ................................ 2008-071724

(51) Int. Cl.
*H04N 1/40* (2006.01)
(52) U.S. Cl. ...... 358/3.28; 358/1.9; 358/1.15; 358/1.18; 358/3.26; 358/3.27; 347/16; 347/257; 235/468; 235/469
(58) Field of Classification Search .................. None
See application file for complete search history.

(56) References Cited

U.S. PATENT DOCUMENTS

| 5,481,293 | A | * | 1/1996 | Kanno | 347/257 |
|---|---|---|---|---|---|
| 6,290,318 | B1 | * | 9/2001 | Yasukawa | 347/16 |
| 6,603,864 | B1 | * | 8/2003 | Matsunoshita | 382/100 |
| 6,651,894 | B2 | * | 11/2003 | Nimura et al. | 235/494 |
| 6,935,565 | B2 | * | 8/2005 | Nimura et al. | 235/468 |
| 7,520,443 | B2 | * | 4/2009 | Kamijoh et al. | 235/494 |
| 7,626,743 | B2 | * | 12/2009 | Ozawa | 358/538 |
| 7,830,555 | B2 | * | 11/2010 | Katsurabayashi | 358/3.28 |
| 7,880,922 | B2 | * | 2/2011 | Onishi | 358/1.2 |
| 7,898,685 | B2 | * | 3/2011 | Onishi | 358/1.18 |
| 2002/0065853 | A1 | * | 5/2002 | Takahashi et al. | 707/527 |
| 2002/0070281 | A1 | * | 6/2002 | Nimura et al. | 235/494 |
| 2004/0041030 | A1 | * | 3/2004 | Nimura et al. | 235/468 |
| 2006/0156234 | A1 | * | 7/2006 | Takahashi et al. | 715/541 |
| 2007/0019245 | A1 | * | 1/2007 | Katsurabayashi | 358/3.28 |
| 2008/0123949 | A1 | * | 5/2008 | Kwon et al. | 382/167 |

FOREIGN PATENT DOCUMENTS

JP  08-098047 A  4/1996
JP  2001-287407 A  10/2001

* cited by examiner

*Primary Examiner* — King Poon
*Assistant Examiner* — Dung Tran
(74) *Attorney, Agent, or Firm* — Sughrue Mion, PLLC

(57) ABSTRACT

An image processing device provided with an acquiring unit and a generating unit. The acquiring unit acquires invisible image data of an invisible image subject to forming on a recording medium with invisible coloring material and acquires source image data of a source image subject to forming on the recording medium with visible coloring material. The generating unit generates corrected-image-data of the source image data corrected according to the absorption wavelength characteristics of the invisible coloring material, such that the color of overlapping regions where both the invisible image and the source image are superimposed when formed on the recording medium approximates to the color of regions corresponding to the overlapping regions in the source image.

11 Claims, 15 Drawing Sheets

FIG. 4

| ABSORPTION WAVELENGTH CHARACTERISTICS OF INVISIBLE COLORING MATERIALS | ABSORPTION WAVELENGTH CHARACTERISTICS OF VISIBLE COLORING MATERIALS | CORRECTION VALUE |
|---|---|---|
|  |  |  |
| ⋮ | | |
|  |  |  |
|  |  |  |
|  |  |  |

| COLOR AND DENSITY INFORMATION OF VISIBLE COLORING MATERIALS | ABSORPTION WAVELENGTH CHARACTERISTICS OF VISIBLE COLORING MATERIALS |
|---|---|
|  |  |
|  |  |
| ⋮ | |
|  |  |
|  |  |
|  |  |

76C

IMAGE PROCESSING DEVICE AND IMAGE FORMING DEVICE FOR GENERATING CORRECTED IMAGE DATA FOR A SOURCE IMAGE ACCORDING TO ABSORPTION WAVELENGTH CHARACTERISTICS OF INVISIBLE COLORING MATERIAL

CROSS-REFERENCE TO RELATED APPLICATION

This application claims priority under 35 USC 119 from Japanese Patent Application No. 2008-071724 filed Mar. 19, 2008.

BACKGROUND

1. Technical Field

The present invention relates to an image processing device and an image forming device.

2. Related Art

A technique is known for adjusting the color of an image, the image based on image data for forming on a recording medium, so that the image color becomes the color of the source image of the image data.

Recently, however, interest has been shown in techniques for incorporating invisible images onto recording media to achieve a fusion of increased security with a digital environment. Specific examples of such invisible images include, for example, information patterns with some identification information such as personal information, and non-information patterns such as detection marks. Code patterns are an example of information patterns. Such invisible images are preferably formed using toners or the like containing infrared absorbing agents. There is the expectation that increased security from visible images is achievable by forming a visible image on a recording medium that has already been formed with an invisible image, or by reading in images from a recording medium that has been formed with both an invisible image and a visible image. Toners or the like containing invisible materials are used for forming invisible images.

SUMMARY

The present invention provides an image processing device and an image forming device which suppress degradation in color reproducibility of source images even on a recording medium that has been formed with an image using an invisible coloring material.

According to an aspect of the present invention, an image processing device includes an acquiring unit that acquires invisible image data of an invisible image subject to forming on a recording medium with invisible coloring material and acquires source image data of a source image subject to forming on the recording medium with visible coloring material; and a generating unit that generates corrected-image-data of the source image data corrected according to the absorption wavelength characteristics of the invisible coloring material, such that the color of overlapping regions where both the invisible image and the source image are superimposed when formed on the recording medium approximates to the color of regions corresponding to the overlapping regions in the source image.

BRIEF DESCRIPTION OF THE DRAWINGS

Exemplary embodiments of the present invention will be described in detail based on the following figures, wherein:

FIG. 4 is a schematic diagram showing a correction table 76B;

FIG. 5 is a schematic diagram showing a source image color table 76C;

DETAILED DESCRIPTION

First Exemplary Embodiment

Figure 1:
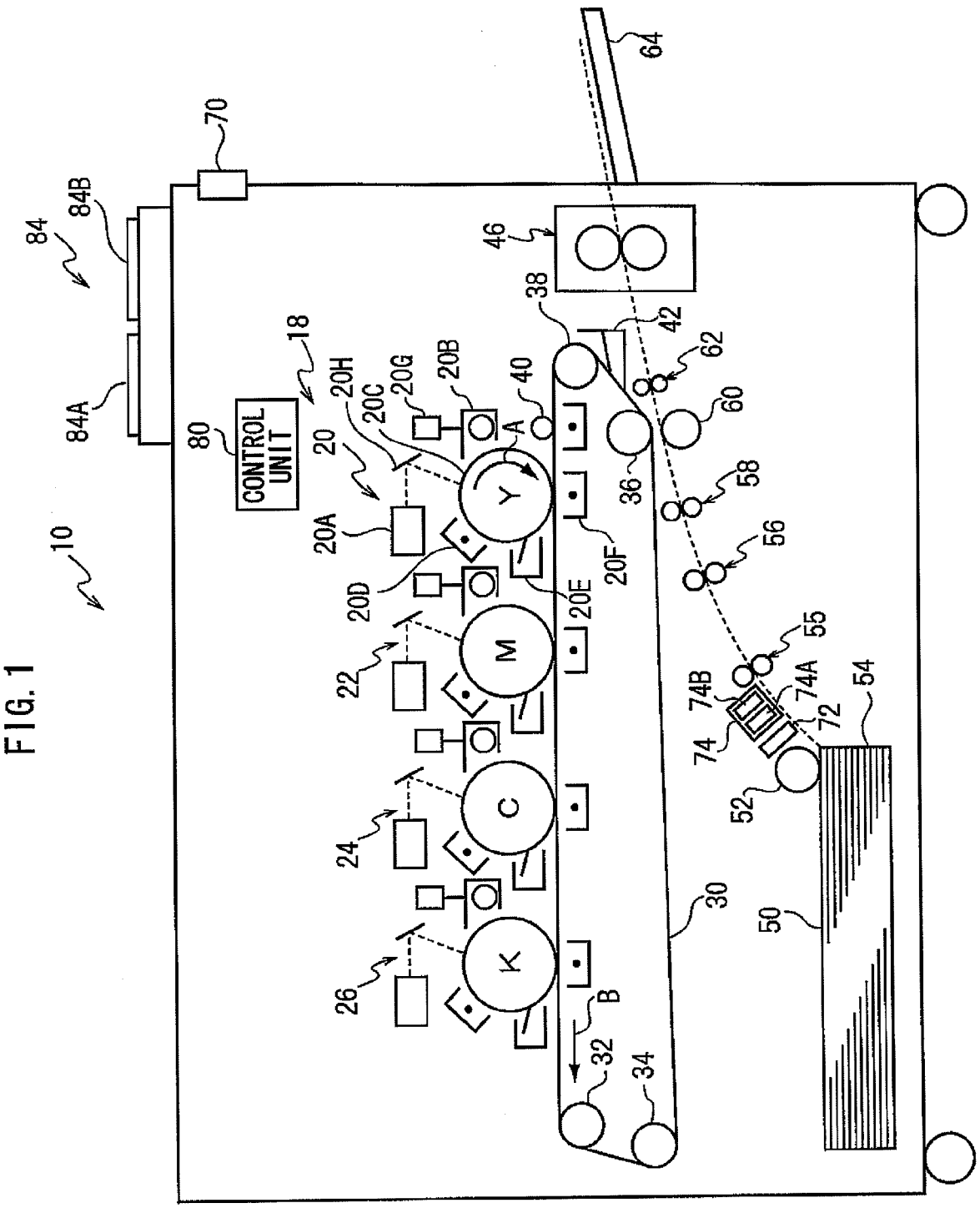
FIG. 1 is a schematic configuration diagram of a multi-function device according to a first exemplary embodiment.

Explanation will be given below of an example of an exemplary embodiment of the present invention, with reference to the drawings. A multi-function device 10, provide with the functionality of an image processing device according to the present invention, is shown in FIG. 1. The multi-function device 10 is provided with a control unit 80, for controlling each device unit provided to the multi-function device 10, and an image forming device 18, for performing image forming processing on a recording medium 50.

It should be noted that the control unit 80 corresponds to the image processing device of the present invention, and the multi-function device 10 corresponds to the image forming device of the present invention.

An operation unit 84 is provided to the top face of the multi-function device 10. The operation unit 84 is configured with a display 84A for displaying messages and the like, and with a keyboard 84B for an operator to input various commands and the like. The operation unit 84 is connected to the control unit 80 such that signals can be sent and received therebetween. The control unit 80 is also connected to the image forming device 18, and the image forming device 18 performs image forming processing under the control of the control unit 80.

A data input-output unit 70 is provided at a side face of the multi-function device 10, for sending and receiving data to external devices, either by wire or wirelessly. The data input-output unit 70 is connected to the control unit 80 such that signals can be sent and received therebetween. Configuration is therefore made such that it is possible to transmit various types of data generated within the multi-function device 10 to external devices, and it is possible to receive various types of data from external devices, such as source image data of images for forming on the recording medium 50 in the multi-function device (referred to below as source images).

The image forming device 18 is provided with an endless intermediate transfer belt 30, entrained around a drive roller 32, a drive roller 34, a drive roller 36 and a drive roller 38. The intermediate transfer belt 30 is a dielectric body with volume resistivity adjusted using carbon for electrostatically transferring toner images, and the intermediate transfer belt 30 is conveyed around the drive roller 32, drive roller 34, drive roller 36 and drive roller 38 in a specific direction (the direction shown by arrow B between the drive roller 32 and the drive roller 38 in FIG. 1). Above the intermediate transfer belt 30 are provided, in sequence along the direction of arrow B in FIG. 1, an image forming unit 20 for forming a Y (Yellow) toner image on the intermediate transfer belt 30, an image forming unit 22 for forming an M (Magenta) toner image on the intermediate transfer belt 30, an image forming unit 24 for forming a C (Cyan) toner image on the intermediate transfer belt 30, and an image forming unit 26 for forming a K (black) toner image on the intermediate transfer belt 30.

The image forming unit 20 is provided with an image holding body 20C, of a circular cylindrical shape rotatable about the axial line thereof in the direction of arrow A of FIG. 1, and disposed so as to contact the outer peripheral surface of the intermediate transfer belt 30. A charging device 20D is provided at the outer periphery of the image holding body 20C, for charging the outer peripheral surface of the image holding body 20C to a specific electrical potential. A scanning light-exposure unit 20A is provided further downstream, in the direction of arrow A of FIG. 1, than the charging device 20D. The scanning light-exposure unit 20A irradiates a laser beam onto the peripheral surface of the image holding body 20C via a mirror 20H. While not shown in the drawings, the scanning light-exposure unit 20A is provided with a laser diode (LD). A laser beam emitted from this LD is modulated according to printing data for Y received from the control unit 80 and the laser beam emitted from the LD is deflected so as to scan the outer peripheral surface of the image holding body 20C along the direction of the axial line of the image holding body 20C (primary scanning). Secondary scanning is achieved by the rotation of the image holding body 20C. An electrostatic latent image for the yellow component of the image is thereby formed in the charged portions on the outer peripheral surface of the image holding body 20C.

Further downstream in the direction of arrow A of FIG. 1, than the laser beam irradiation position on the outer peripheral surface of the 20C, are disposed, in sequence, a developing device 20B, a transfer device 20F, and a cleaning device 20E. The developing device 20B is supplied with Y toner by a toner supply unit 20G, and develops the electrostatic latent image formed by the scanning light-exposure unit 20A with Y toner of yellow color to form a yellow Y toner image. The transfer device 20F is disposed so as to face the outer peripheral surface of the image holding body 20C with the intermediate transfer belt 30 interposed therebetween. The Y toner image formed on the outer peripheral surface of the image holding body 20C is transferred to the outer peripheral surface of the intermediate transfer belt 30. Any toner remaining on the outer peripheral surface of the image holding body 20C is removed by the cleaning device 20E.

Since the image forming unit 22, the image forming unit 24 and the image forming unit 26 are of a similar configuration to that of the image forming unit 20, explanation thereof will be omitted. However, the colors of the toner images are different from each other, and developing is performed in the image forming unit 22 with a magenta toner of magenta color to form a magenta image. In a similar manner, in the image forming unit 24 developing is performed with a cyan toner of cyan color to form a cyan image, and in the image forming unit 26 developing is performed with a black toner of black color to form a black image.

The respective colors of toner images formed on the image forming unit 20, the image forming unit 22, the image forming unit 24 and the image forming unit 26, respectively, are transferred onto the outer peripheral surface of the intermediate transfer belt 30 so that the toner images are superimposed on each other. A full color toner image is thereby formed on the outer peripheral surface of the intermediate transfer belt 30. Upstream in the rotation direction of the intermediate transfer belt 30 from the image forming unit 20 are provide, in sequence, an attraction roller 40 for maintaining the surface electrical potential of the intermediate transfer belt 30 at a specific electrical potential in order to impart the intermediate transfer belt 30 with good toner-attracting properties, and a cleaning device 42 for removing toner from the intermediate transfer belt 30.

A tray 54 is provided below the position of the intermediate transfer belt 30. Plural sheets of the recording medium 50 are accommodated in a stacked state within the tray 54. Sheets of the recording medium 50 accommodated within the tray 54 are fed out from the tray 54 by rotation of a feed roller 52. The sheets of recording medium 50 are conveyed to the transfer position (the position where the drive roller 36 and a transfer roller 60 are disposed) by conveying roller pairs 55, 56, 58. The transfer roller 60 faces the drive roller 36 so that the intermediate transfer belt 30 is interposed therebetween. The full color toner image formed on the outer peripheral surface of the intermediate transfer belt 30 is transferred onto the recording medium 50, which has been conveyed to the transfer position, by nipping the recording medium 50 between the transfer roller 60 and the intermediate transfer belt 30. The recording medium 50 onto which the toner image has been transferred is then conveyed to a fixing device 46 by a conveying roller pair 62, and after fixing has been undertaken by the fixing device 46 the recording medium 50 is then discharged into a paper tray 64.

The image formed by the above image forming device 18 is a visible image, visible to the naked eye, however in the multi-function device 10 of the present exemplary embodiment there is an invisible image formed to the recording medium 50 with an invisible coloring material before this image forming processing is performed on the recording medium 50. It should be noted that in the present exemplary embodiment "invisible" denotes not being readily visible to the naked eye, but whilst it denotes being difficult to observe it does not mean that it is completely impossible to observe with the naked eye. The invisible coloring material used for forming the invisible image here is one having a component that absorbs light of a wavelength within the visible region. Therefore the invisible image exhibits absorption of light within the visible region wavelengths, and while having a comparatively faint image with respect to visible images, the invisible image can be observed when in the colored state.

Details will be given later regarding the visible images, however in general terms these are images that have a maximum absorption to light of a wavelength within the visible region. In the present exemplary embodiment the visible images are formed with a toner or the like that includes a visible coloring material having a maximum absorption to light of a wavelength within the visible region (a wavelength from 380 nm to 780 nm). Details will be given later regarding the invisible images, however in general terms these are images having a maximum absorption to light of a wavelength within the invisible regions of the infrared region or the ultraviolet region. In the present exemplary embodiment the invisible images are formed with a toner or the like that includes an invisible coloring material having a maximum absorption to light of a wavelength within an invisible region (a wavelength from 10 nm to 380 nm, or from 780 nm to 1 mm).

The invisible images formed on the recording medium 50 are formed with an "invisible toner" adjusted so as to normally be difficult for a person to ascertain with the naked eye.

Various toners may be use for the invisible toner, and examples of toners that can be used as the invisible toner include those containing an ultraviolet absorbing agent or an infrared absorbing agent as the invisible coloring material.

A toner containing an infrared absorbing agent may be configured containing at least a binder resin and an infrared absorbing agent, with additives such as release agents added as required.

Since known binder resins, release agents and additives may be used, detailed explanation thereof will be omitted, however the infrared absorbing agent is one having a maximum absorption in the wavelength range of from 750 nm to 1100 nm.

Examples of compounds exhibiting absorption spectra (hereinafter referred to below as absorption wavelength characteristics) as indicated above include n-butoxy-substituted naphthalocyanine represented by Formula (1) below (hereinafter sometimes abbreviated to "$H_2$NPc-OnBu"), n-butoxy-substituted vanadyl naphthalocyanine of Formula (2) below in which M is VO (hereinafter sometimes abbreviated to "VONPc-OnBu"), n-butoxy-substituted copper naphthalocyanine of Formula (2) below in which M is Cu (hereinafter sometimes abbreviated to "CuNPc-OnBu"), n-butoxy-substituted nickel naphthalocyanine of Formula (2) below in which M is Ni (hereinafter sometimes abbreviated to "NiNPc-OnBu"), phenyl-substituted vanadyl naphthalocyanine represented by Formula (3) below (hereinafter sometimes abbreviated to "VONPc-Ph"), i-butoxy/nitro-substituted copper naphthalocyanine represented by Formula (4) below (hereinafter sometimes abbreviated to "CuNPc-OiBuNO$_2$"), t-butyl-substituted vanadyl naphthalocyanine represented by Formula (5) below (hereinafter sometimes abbreviated to "VONPc-tBu"), a compound represented by Formula (6) below (hereinafter sometimes referred to as "ST173"), a compound represented by Formula (7) below (hereinafter sometimes referred to as "CR44(OH)$_2$"), and unsubstituted vanadyl naphthalocyanine represented by Formula (8) below (hereinafter sometimes abbreviated to "VONPc").

The symbol "OBu" in Formula (1) below and Formula (2) below means an "n-butoxy group", and the symbol "OBu" in Formula (4) means an "i-butoxy group".

It should be noted that infrared absorbing agents are not limitation to these examples.

Formula (1)

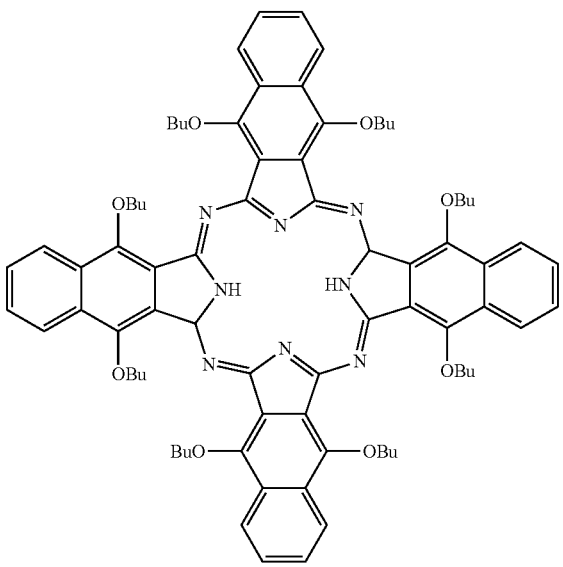

Formula (2)

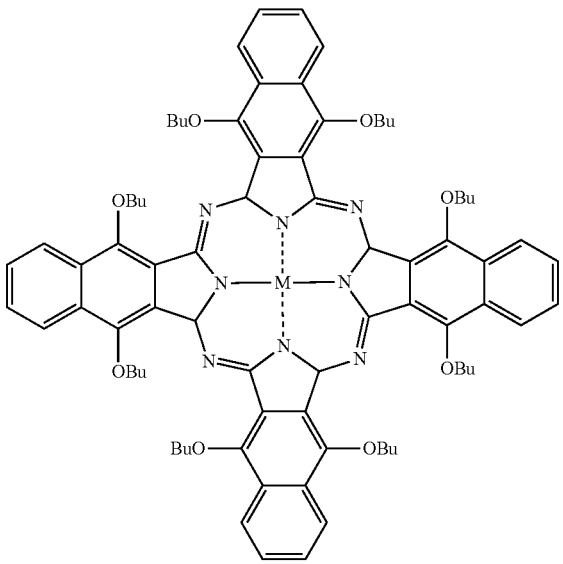

Formula (3)
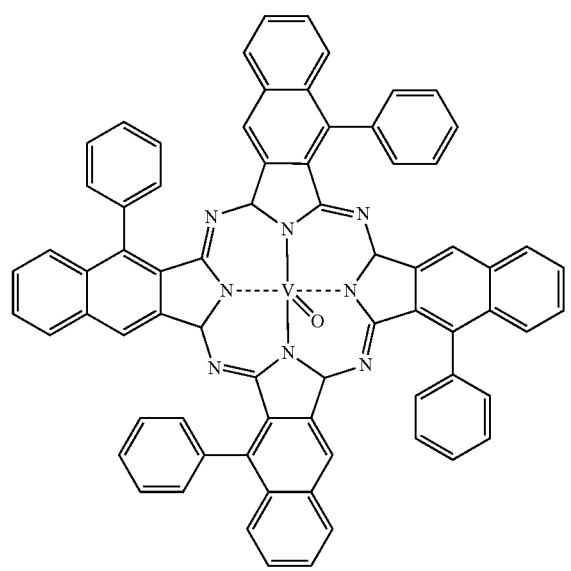
(Formula 4)
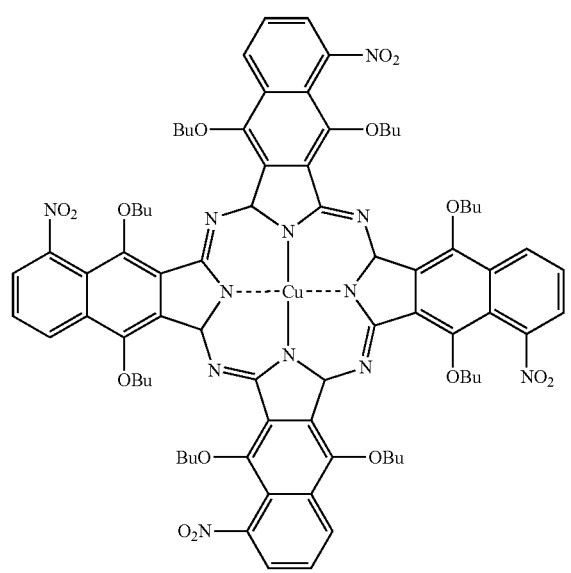
Formula (5)
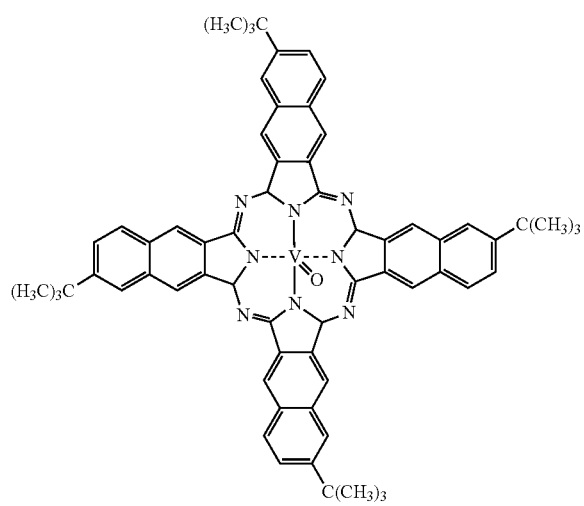
Formula (6)
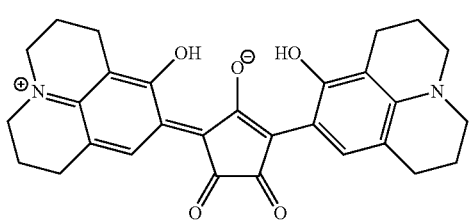
Formula (7)
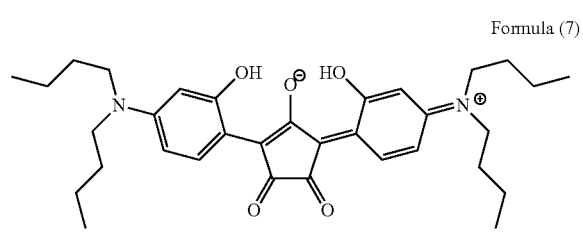
Formula (8)
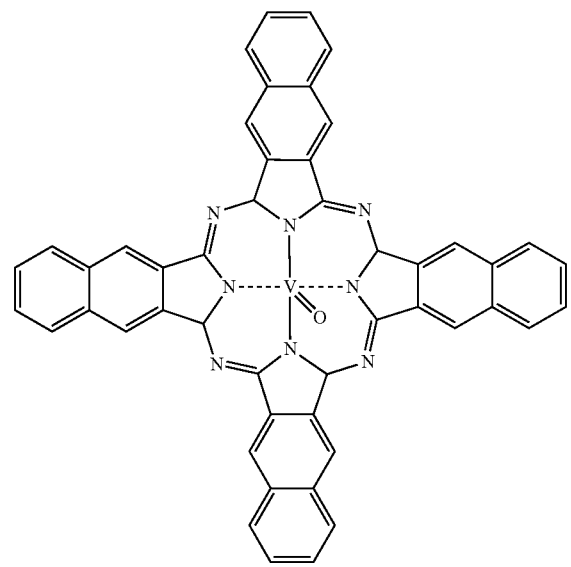
The absorption wavelength characteristics obtained by measurement as described above for H$_2$NPc-OnBu, VONPc-OnBu, ST173, CR44(OH)$_2$ and VONPc are shown in FIGS. 6 to 10 respectively.

Absorption wavelength characteristics are, for example, measured in the following manner.

First, 0.5 parts by weight of an infrared absorbing agent and 99.5 parts by weight of an acrylic polymerized resin (trade name: BR-83, manufactured by Mitsubishi Rayon Co., Ltd.) are mixed together, and the resulting mixture dissolved in an organic solvent (for example tetrahydrofuran) to obtain an infrared absorbing agent dispersion coating solution.

Next, the infrared absorbing agent dispersion coating solution is immersion coated onto a glass plate, and a doped film with a thickness of 3 µm is obtained.

The absorption wavelength characteristics of the doped film obtained as described above is measured by means of a spectrophotometer (trade name: U-2000, manufactured by Hitachi Co., Ltd.).

An invisible image formed with an invisible toner containing one of the above infrared absorbing agents as an invisible coloring material is ideally completely colorless and transparent. However, as shown in FIGS. 6 to 10, invisible coloring materials exhibit absorption to light of wavelength within the visible region, and so it is rare for these to be observed as being completely colorless and transparent. Therefore, when an invisible image and a visible image are formed so as to be superimposed on the recording medium 50, the color and density of the overlapping regions, where the invisible image and the visible image are superimposed, are sometimes observed as being of a color with a different color and density to regions corresponding to the overlapping regions in the source image.

The multi-function device 10 in the present exemplary embodiment performs correction of the source image data of the source image (detailed later) so that the color and density of the overlapping regions where the invisible image and the visible image are superimposed on the recording medium 50 approximate to the color of the corresponding regions in the source image.

"Color and density . . . approximate to . . . " indicates that, the visual result of the color and density of the overlapping regions where the invisible image and the visible image are superimposed on the recording medium 50, and the visual result of the color and density of the corresponding regions of the source image, are visually the same color and density or a nearly identical color and density that is virtually the same.

An invisible image read-out unit 74 is also provided between the feed roller 52 and the transfer roller 60 in the multi-function device 10 of the present exemplary embodiment.

Whilst not shown in the diagrams, the invisible image read-out unit 74 is configured with a light source 74A that irradiates light (sometimes referred to below as invisible light) of an invisible region (infrared region or ultraviolet region) onto the recording medium 50, and with an invisible light sensor 74B that receives reflected light that has been irradiated from the light source 74A and then reflected by the recording medium 50.

In the present exemplary embodiment explanation will be given of an invisible image read-out unit 74 that detects the absorbance of two different wavelengths (wavelength A and wavelength B) from light each of wavelengths in an invisible region. Consequently the light source 74A irradiates light of at least two mutually different preset wavelengths each within an invisible region, and the invisible light sensor 74B is provided with capability to measure the absorbance at these two respective wavelengths. These two wavelengths should be two wavelengths capable of identifying the absorption wavelength characteristics of an invisible image by comparison of the absorbance of these two wavelengths. Namely, with the absorbance of only a single specific wavelength, different absorbances are obtained depending on the density of the invisible image, even with invisible images of the same absorption wavelength characteristics. However, by comparison of the absorbance of two chosen wavelengths, the ratio is substantially constant for the same absorption wavelength characteristics, even though densities of invisible images may differ. The type of invisible coloring material of the invisible image (the type of infrared absorbing agent) can hence readily be identified from this ratio. This results in easy, speedy and assured identification of the invisible image absorption wavelength characteristics, required for correction.

It should be noted that, as stated above, since invisible coloring materials and invisible images contain components that absorb light of wavelengths in the visible region, they are not necessarily observed as being completely colorless and transparent, and while having a comparatively faint color in comparison to visible images, they are sometimes observed as being in a state with some degree of color. Consequently, in the present exemplary embodiment, "density of the invisible image" indicates a density for the invisible image (an invisible coloring material used for an invisible images) according to the absorbance of the wavelengths in the visible region.

A medium detection sensor 72 for detecting the conveyed recording medium 50 is provided further upstream in the medium conveying direction from the intermediate transfer belt 30 than the invisible image read-out unit 74 (at the tray 54 side thereof).

Figure 2:
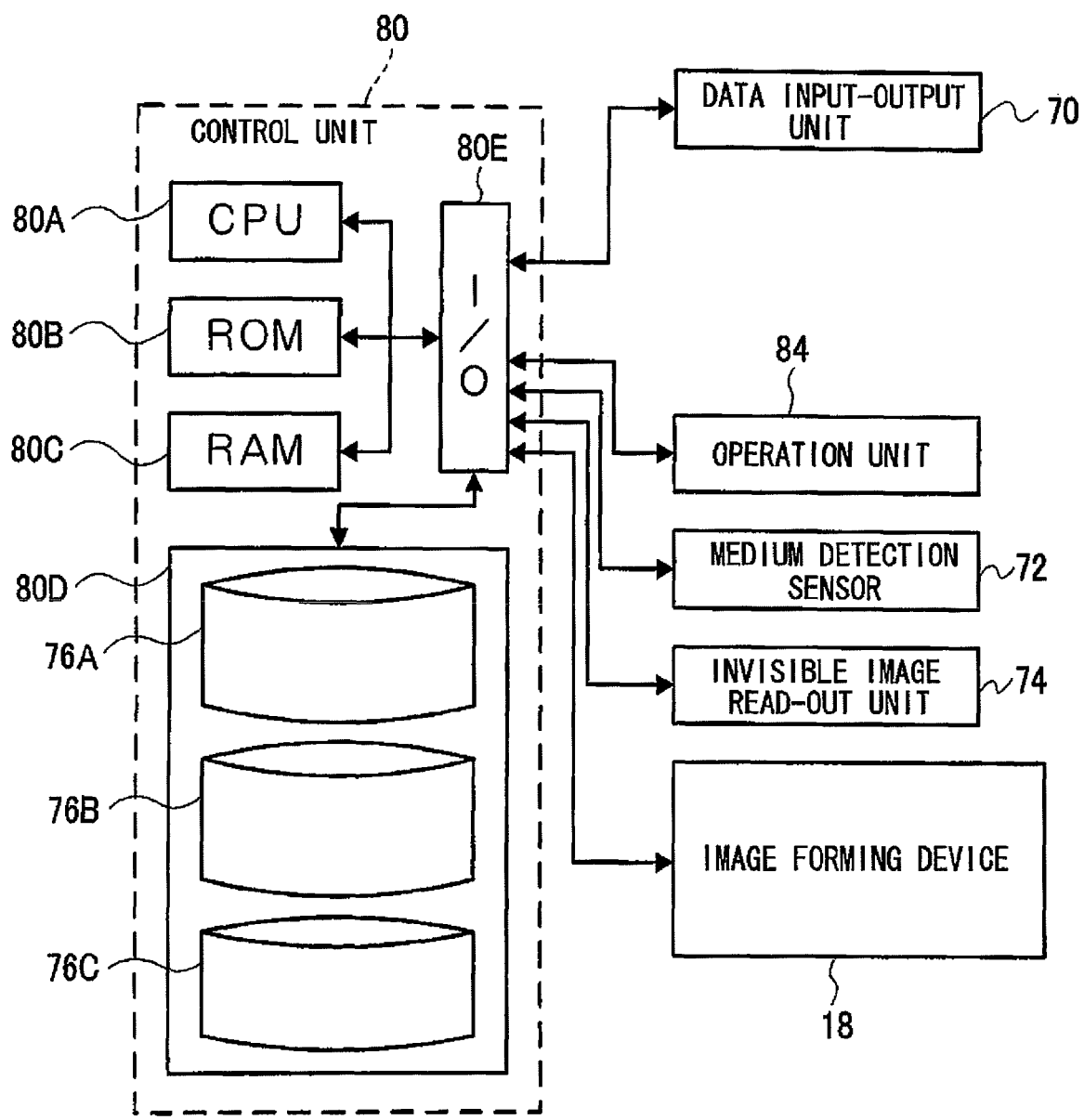
FIG. 2 is a schematic block diagram showing an electrical configuration of a multi-function device according to the first exemplary embodiment.

The control unit 80 controls the operation of each unit of the multi-function device 10. The control unit 80, as shown in FIG. 2, is configured with a CPU 80A, a ROM 80B, a RAM 80C, a HDD 80D (hard disk drive), and an I/O (input-output circuit) 80E. These CPU 80A, ROM 80B, RAM 80C, HDD 80D (hard disk drive), and I/O (input-output circuit) 80E are mutually connected so as to be able to send and receive signals between each other.

The control unit 80 is connected so as to be able to send and receive signals to the data input-output unit 70, operation unit 84, medium detection sensor 72, invisible image read-out unit 74, and image forming device 18 described above.

The HDD 80D is preinstalled with a corrected-image-data generation program for performing image correction processing (details given later), and corrected-image-data generation processing is performed by the control unit 80 executing the corrected-image-data generation program in the CPU 80A. The corrected-image-data generation processing is processing to generate corrected-image-data in which the source image data of the image subject to printing (referred to as the source image) has been corrected.

Figure 3:
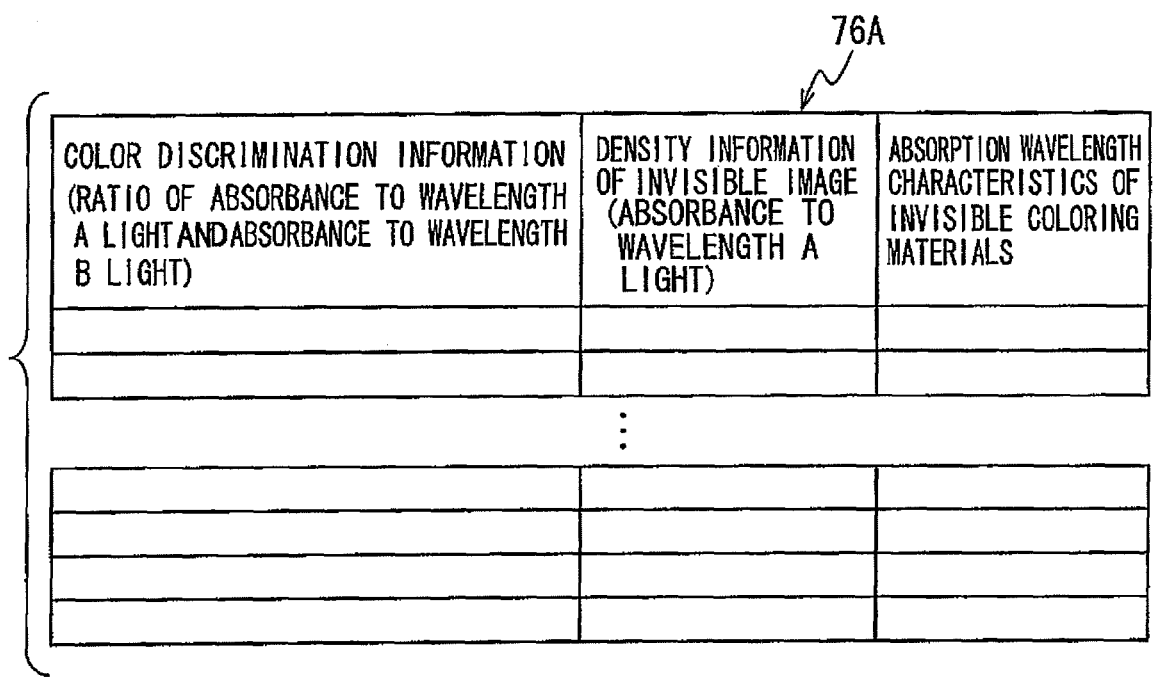
FIG. 3 is a schematic diagram showing an invisible image table 76A.
Figure 6:
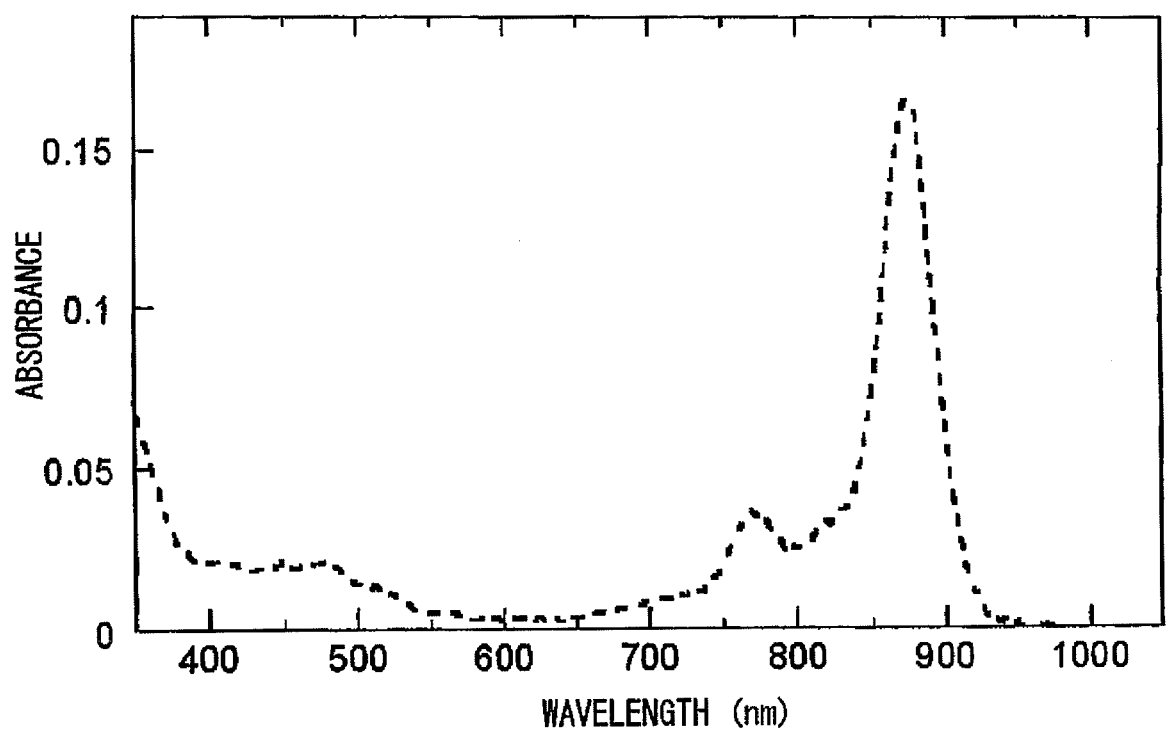
FIG. 6 is a graph of the absorption wavelength characteristics of n-butoxy-substituted napthalocyanine ($H_2NPc$-OnBu) represented in Formula (1) below.
Figure 7:
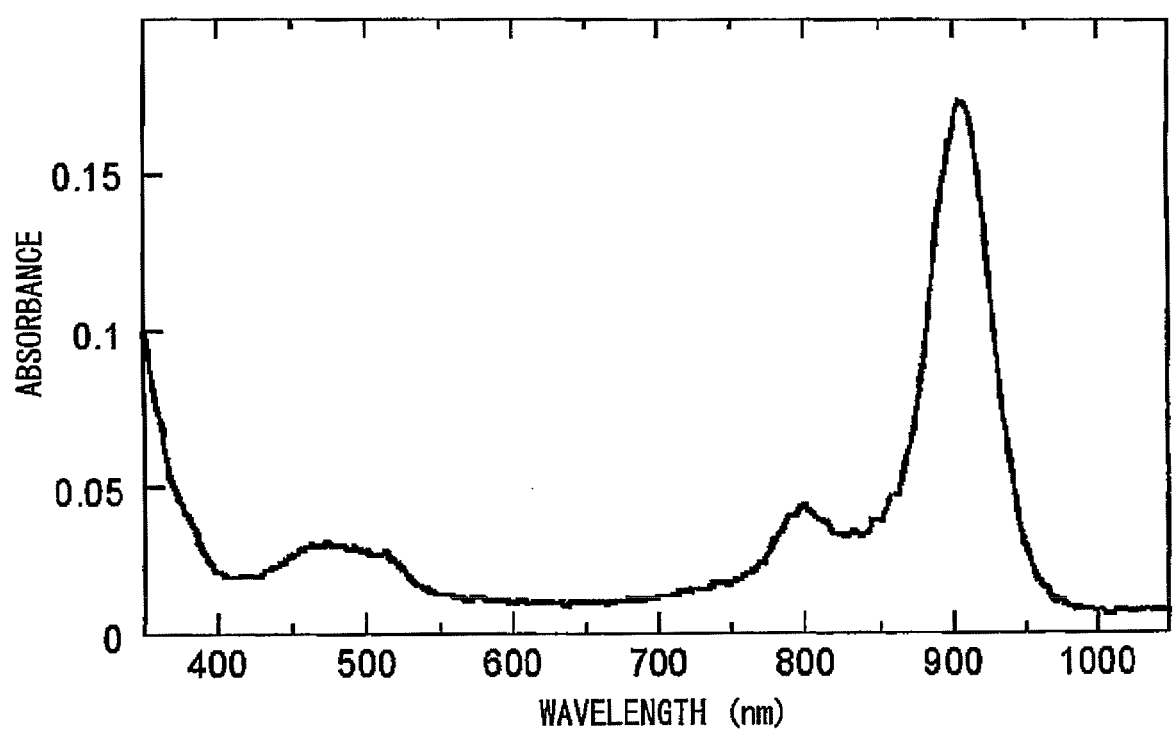
FIG. 7 is a graph of the absorption wavelength characteristics of n-butoxy-substituted vanadyl naphthalocyanine (VONPc-OnBu) represented in Formula (2) below in which M is VO.
Figure 8:
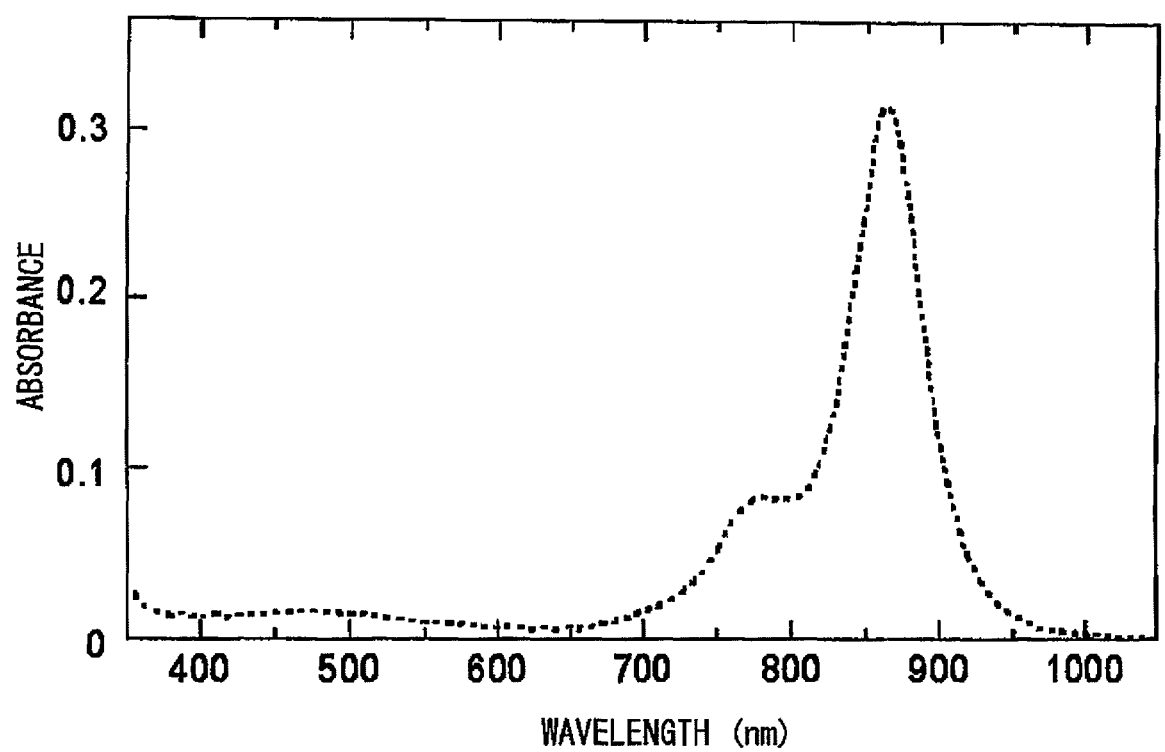
FIG. 8 is a graph of the absorption wavelength characteristics of compound ST173 represented in Formula (6) below.
Figure 9:
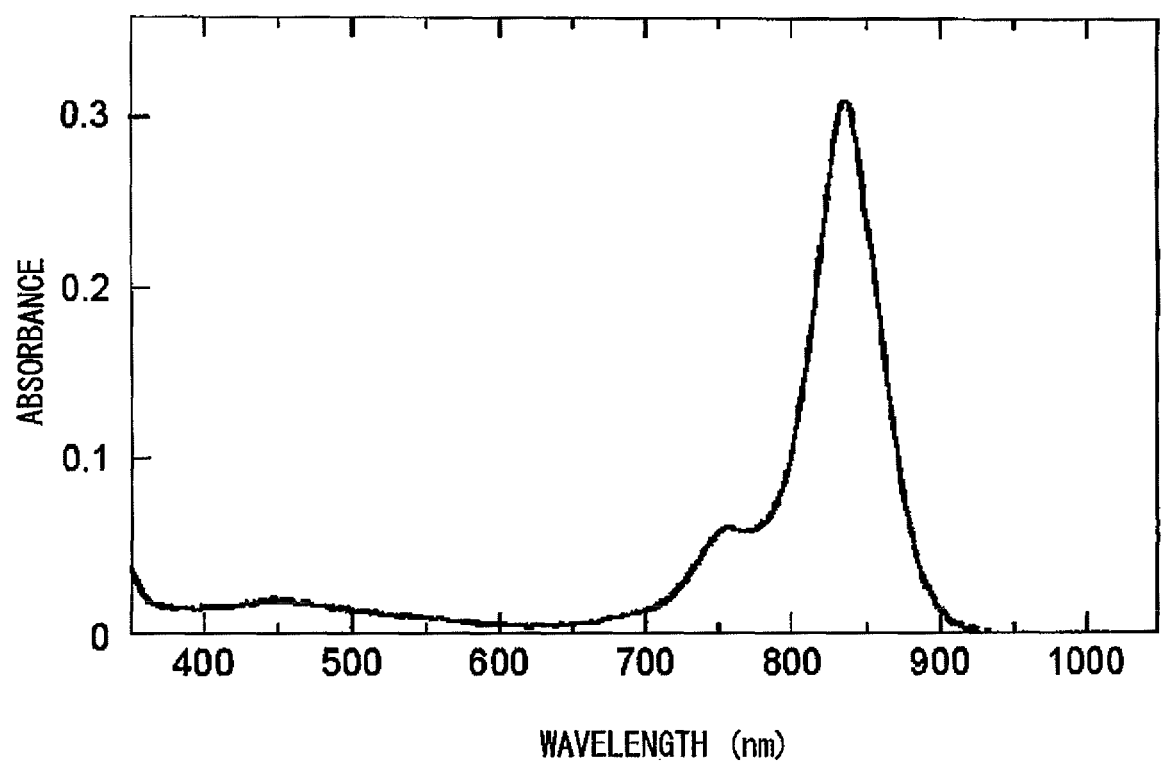
FIG. 9 is a graph of the absorption wavelength characteristics of the compound represented in Formula (7) below.
Figure 10:
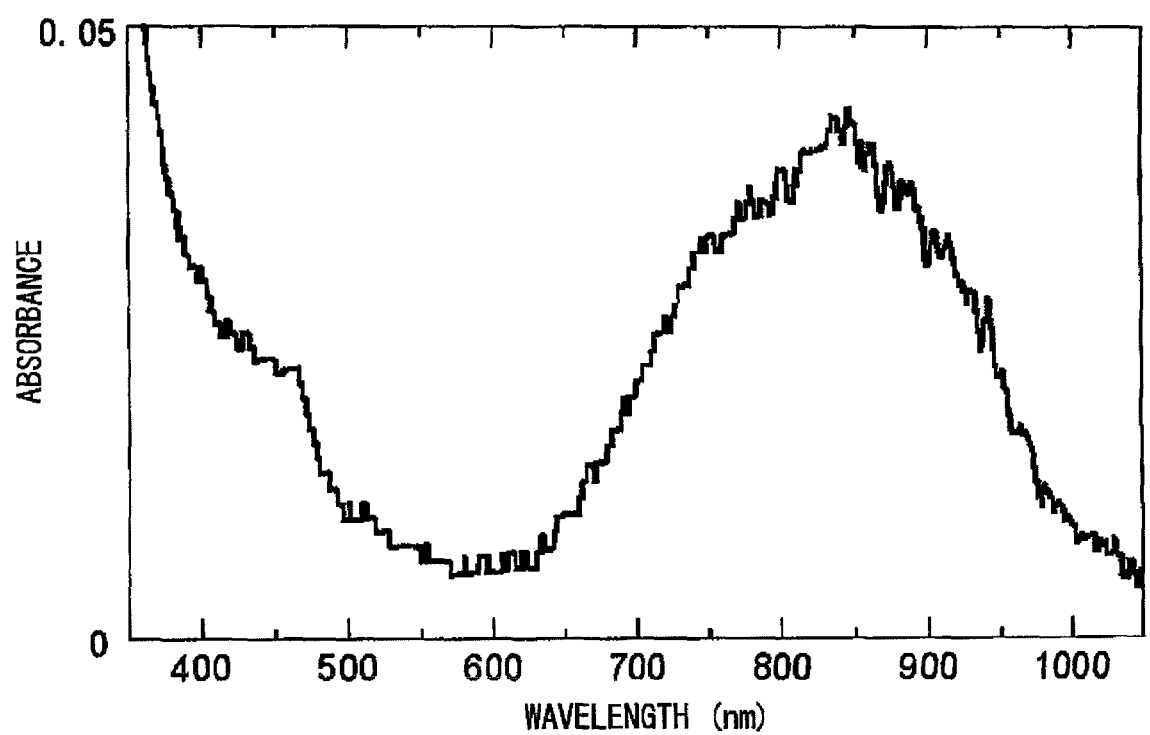
FIG. 10 is a graph of the absorption wavelength characteristics of unsubstituted vanadyl naphthalocyanine represented in Formula (8) below.

In addition, an invisible image table 76A (see FIG. 3), a correction table 76B (see FIG. 4), and a source image color table 76C (see FIG. 5) are pre-stored on the HDD 80D.

The invisible image table 76A is pre-stored with color discrimination information for discriminating the color of invisible coloring materials used in invisible images, density information representing the density of the invisible images, and the absorption wavelength characteristics of the invisible coloring materials used for the invisible images, these being stored associated with each other.

The color discrimination information is discrimination information for discriminating the color observed of an invisible coloring material used in an invisible image (in other words the color corresponding to the component exhibiting light absorption in the visible light region). In the present exemplary embodiment, information representing the ratio of absorbance corresponding to light of two mutually different wavelengths each within an invisible region wavelength (explanation will be given using wavelength A, and wavelength B) are stored in the invisible image table 76A as the color discrimination information. The above described light source 74A is configured capable of irradiating light of each of the above wavelength A and wavelength B, as the light of at least two mutually different preset wavelengths each within an invisible region. Consequently the invisible light sensor 74B in the present exemplary embodiment is provided with capability to measure the absorbance at each of the wavelength A and wavelength B.

The density discrimination information is discrimination information for discriminating the density of the color of invisible coloring materials used in the invisible images, and is information for discriminating the density of the color observed due to the component exhibiting absorption to light in the visible light region. In the present exemplary embodiment, information representing the absorbance of, for example, wavelength A, as a specific wavelength within an invisible region, is pre-stored in the invisible image table 76A as the density discrimination information.

The absorption wavelength characteristics of the invisible coloring materials is, as stated above, information representing the spectra showing the absorbance of the invisible coloring materials in wavelength regions from the infrared region through the visible region to the infrared region. In the present exemplary embodiment, absorption wavelength characteristics of plural invisible coloring materials that might be formed on the recording medium 50 are stored, associated with the above color discrimination information and density discrimination information.

It should be noted that while explanation is given of the present exemplary embodiment in which information representing the spectra showing the absorbance of the invisible coloring materials in wavelength regions from the infrared region through the visible region to the infrared region is pre-stored as the absorption wavelength characteristics of the invisible coloring materials, information representing the color and density in steps, such as simply light red, dark red etc., may be stored as the absorption wavelength characteristics, or information represented quantitatively by numbers may be stored as the absorption wavelength characteristics. However, when spectral information is used for the absorption wavelength characteristics, as explained in detail later, correction of the source image data is performed so that the images formed on the recording medium 50 are closer to the color and density of the source images.

The absorption wavelength characteristics of the invisible coloring materials, the absorption wavelength characteristics of visible coloring materials, and correction value information are stored, associated with each other, in correction table 76B.

The absorption wavelength characteristics of the invisible coloring materials are the same as the absorption wavelength characteristics of the invisible coloring materials stored in the above invisible image table 76A. The absorption wavelength characteristics of the visible coloring materials are absorption wavelength characteristics representing the absorbance from the infrared region through the visible region to the infrared region under the assumption that a source image subject to forming on the recording medium 50 has been formed using the visible coloring material on the recording medium 50 without being formed superimposed on an invisible image.

The correction value information is information representing correction values for correcting source image data of the source image such that the color and density of overlapping regions, where at least a portion of an invisible image formed using an invisible coloring material and a source image subject to forming with a visible coloring material will overlap with each other when formed on the same recording medium 50, approximates to the color and density of regions corresponding to the overlapping regions in the source image if formed without superimposing with the invisible image on the recording medium 50.

Absorption wavelength characteristics of visible coloring materials, associated with the color and density of visible coloring materials, are pre-stored in the source image color table 76C. The color and density of visible coloring materials is information representing the color and density of a visible image formed on the recording medium 50 with Y-color toner, M-color toner, C-color toner, or K-color toner, or with a mixture of plural of these colors of toner. The absorption wavelength characteristics of visible coloring materials are the same as the absorption wavelength characteristics of visible coloring materials stored in the above correction table 76B.

Figure 11:
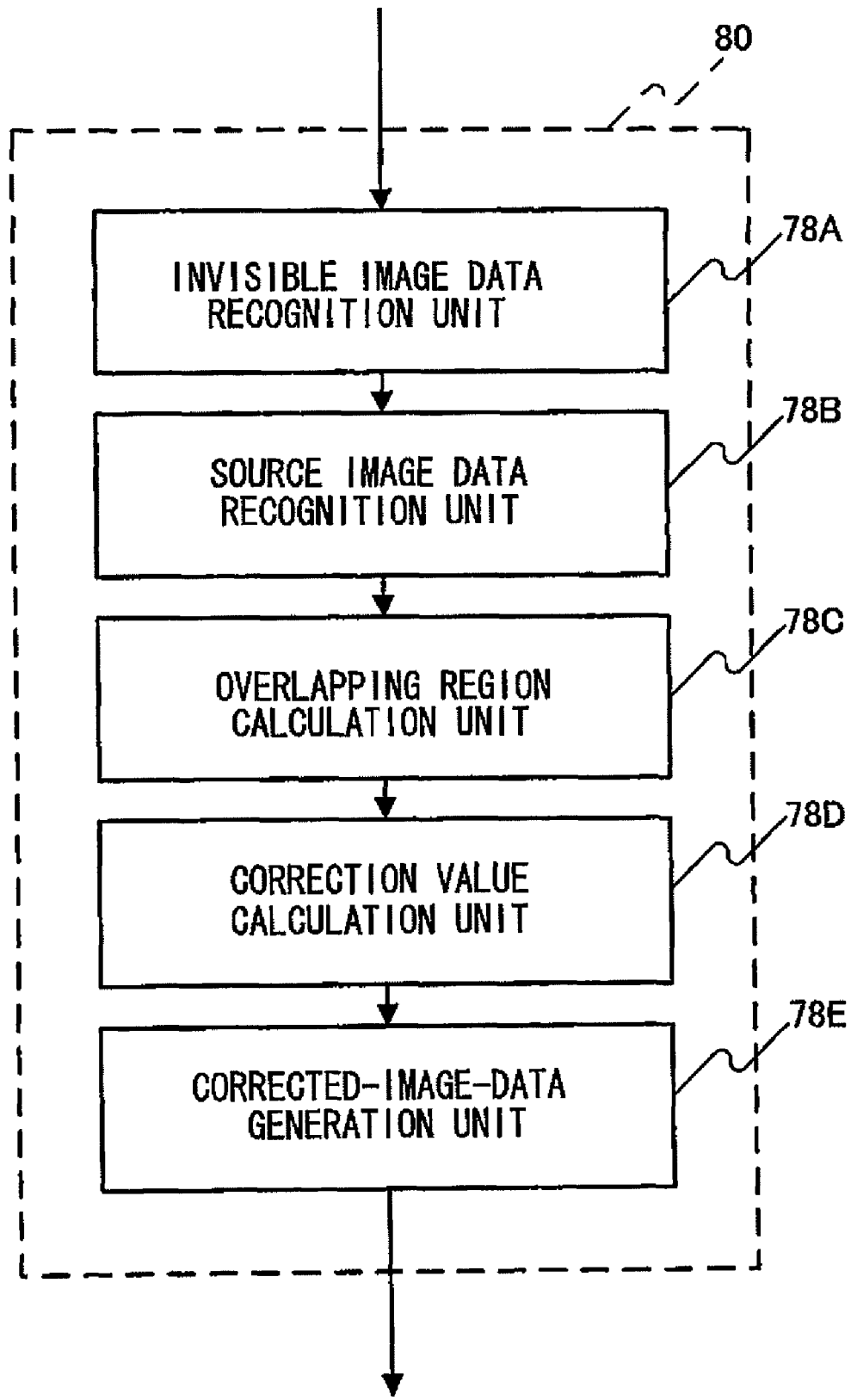
FIG. 11 is a schematic functional block diagram showing the functionality of a control unit according to the first exemplary embodiment.

The CPU 80A of the control unit 80, as shown in the functional block diagram of FIG. 11, is configured with an invisible image data recognition unit 78A, a source image data recognition unit 78B, an overlapping region calculation unit 78C, a correction value calculation unit 78D and a corrected-image-data generation unit 78E.

The invisible image data recognition unit 78A is a functional unit for recognizing the position of invisible images on the recording medium 50 and for recognizing the absorption wavelength characteristics of the invisible coloring materials used for the invisible images. The source image data recognition unit 78B is a functional unit for recognizing the position of source images subject to forming on the recording medium 50 and recognizing the absorption wavelength characteristics of the visible coloring materials used for forming the source images. The overlapping region calculation unit 78C is a functional unit for calculating any overlapping regions on the recording medium 50 where the source images subject to forming on the recording medium 50 would be superimposed on invisible images that have been formed on the recording medium 50. The correction value calculation unit 78D is a functional unit for calculating correction values to correct the source image data such that the color and density of the overlapping regions, computed by the overlapping region calculation unit 78C, approximates to the color and density of corresponding regions of the source images. The corrected-image-data generation unit 78E is a functional unit that generates corrected-image-data in which the source image data has been corrected, based on the correction values derived by the correction value calculation unit 78D.

Explanation will now be given of details of the function of each of the functional units.

The invisible image data recognition unit 78A obtains the absorption wavelength characteristics of invisible coloring material used in an invisible image, from the absorbance measured by the invisible image read-out unit 74 of two wavelengths (wavelength A and wavelength B) that have been irradiated onto the invisible image, and computes the position of the invisible image on the recording medium 50.

More precisely, the invisible image data recognition unit 78A reads out, from the invisible image table 76A, the absorption wavelength characteristics of the invisible coloring material that both corresponds to the ratio of the absorbance, measured by the invisible image read-out unit 74, of two wavelengths (wavelength A and wavelength B) that have been irradiated onto the invisible images, and the absorbance of the wavelength A, obtaining the absorption wavelength characteristics of the invisible coloring material.

The position of the invisible images on the recording medium 50 may, for example, be calculated by: partitioning the total region on the recording medium 50 into plural regions such that regions with light absorption ratios within a few % of each other are grouped so as to belong to a group of regions, based on the measurement results of the absorbance for the whole region of the recording medium 50 read by the invisible image read-out unit 74, and using the boundaries between these regions for the position of the invisible image.

The invisible image read-out unit 74 may read out information representing the absorbance of each region from plural pre-partitioned regions, corresponding to each pixel of images for forming on the recording medium 50 using visible coloring materials. Therefore the disposition and size etc. of sensors of the invisible image read-out unit 74 can be adjusted in advance.

The source image data recognition unit 78B obtains from the source image data of the source image subject to forming on the recording medium 50 the absorption wavelength characteristics of the visible coloring materials for used in forming the source image, and also calculates the position where the source image is to be formed on the recording medium 50.

More precisely, the source image data recognition unit 78B performs color space conversion processing for converting source image data (data in R, G, B color space) pre-stored in the HDD 80D, or source image data (data in R, G, B color space) received from an external device via the data input-output unit 70, into data in C, M, Y, K color space appropriate for printing on the recording medium 50 with the image forming device 18. Such color space conversion processing may be performed by direct conversion of the data in R, G, B color space into C, M, Y, K color space using, for example, a DLUT, or may be performed by first performing conversion of R, G, B color space data into C, M, Y, K color space data using a DLUT and then using UCR (Under Color Removal) processing using a single dimension LUT on the converted C, M, Y, K color space data.

Information representing the color and density and the position on the recording medium 50 of each pixel of the source image, included in the converted source image data, is read out. The position of the source images on the recording medium 50 is derived by reading out the position of each of the pixels of the source image (the position of each of the pixels configuring the source image) from the source image data.

The absorption wavelength characteristics of the visible coloring materials used for forming the source image is obtained by reading out from the source image color table 76C the absorption wavelength characteristics of the visible coloring materials corresponding to the color and density of each of the pixels of the source image, included in the converted source image data.

The overlapping region calculation unit 78C computes the overlapping regions on the recording medium 50 where the source image subject to forming on the recording medium 50 would be superimposed on the invisible image formed on the recording medium 50. This computation, for example, may be by computing the region where the source image would be superimposed on the invisible image when formed on the recording medium 50, based on the position of the invisible image and the position of the source image on the recording medium 50, obtained respectively from the above invisible image data recognition unit 78A and from the source image data recognition unit 78B.

The correction value calculation unit 78D calculates correction values for correcting source image data of the source images, such that the color and density of overlapping regions calculated by the overlapping region calculation unit 78C approximate to the color and density of corresponding regions in the source images. First, the correction value calculation unit 78D reads out, from the source image color table 76C, the absorption wavelength characteristics of the visible coloring materials corresponding to the color and density information of the visible coloring materials representing the color and density of the regions corresponding to the overlapping regions, within the invisible images computed by the overlapping region calculation unit 78C.

Then, correction value information, which both corresponds to the absorption wavelength characteristics of the visible coloring materials read out above and to the absorption wavelength characteristics of the invisible coloring material derived by the invisible image data recognition unit 78A, is read out from the correction table 76B for each of the pixels of the regions of the source image corresponding to the overlapping regions computed by the overlapping region calculation unit 78C. The correction value calculation unit 78D thereby calculates correction values for correcting the data in the source image data for the regions in the source image that correspond to the above overlapping regions.

It should be noted that each of the correction values in the correction table 76B may be calculated and stored in advance.

These correction values are, for example, found by first searching for the absorption wavelength characteristics (spectrum) in the source image color table 76C that is the same, or the nearest approximation, to a combination spectrum of the absorption wavelength characteristics (spectrum) of the invisible coloring material used in the invisible image combined with absorption wavelength characteristics (spectrum) of visible coloring materials for use in forming the source image. The correction values may then be obtained by reading out from the correction table 76B the correction values corresponding to the found absorption wavelength characteristics of the visible coloring materials.

The corrected-image-data generation unit 78E produces corrected-image-data in which the source image data has been corrected based on the correction values calculated by the correction value calculation unit 78D. The corrected-image-data is, for example, generated by correcting the data for each of C, M, Y, and K for each of the pixels in the regions of the source image corresponding to the above overlapping regions, using the correction values.

Explanation will now be given of processing executed in the CPU 80A of the multi-function device 10 when forming the visible images on the recording medium 50, based on the source image data of the source images. It should be noted that while explanation is given of the present exemplary embodiment where the source image data for the source images subject to forming on the recording medium 50 is pre-stored on the HDD 80D, there is no limitation to such a mode, and the source image data may be acquired from an external device through the data input-output unit 70.

Figure 12:
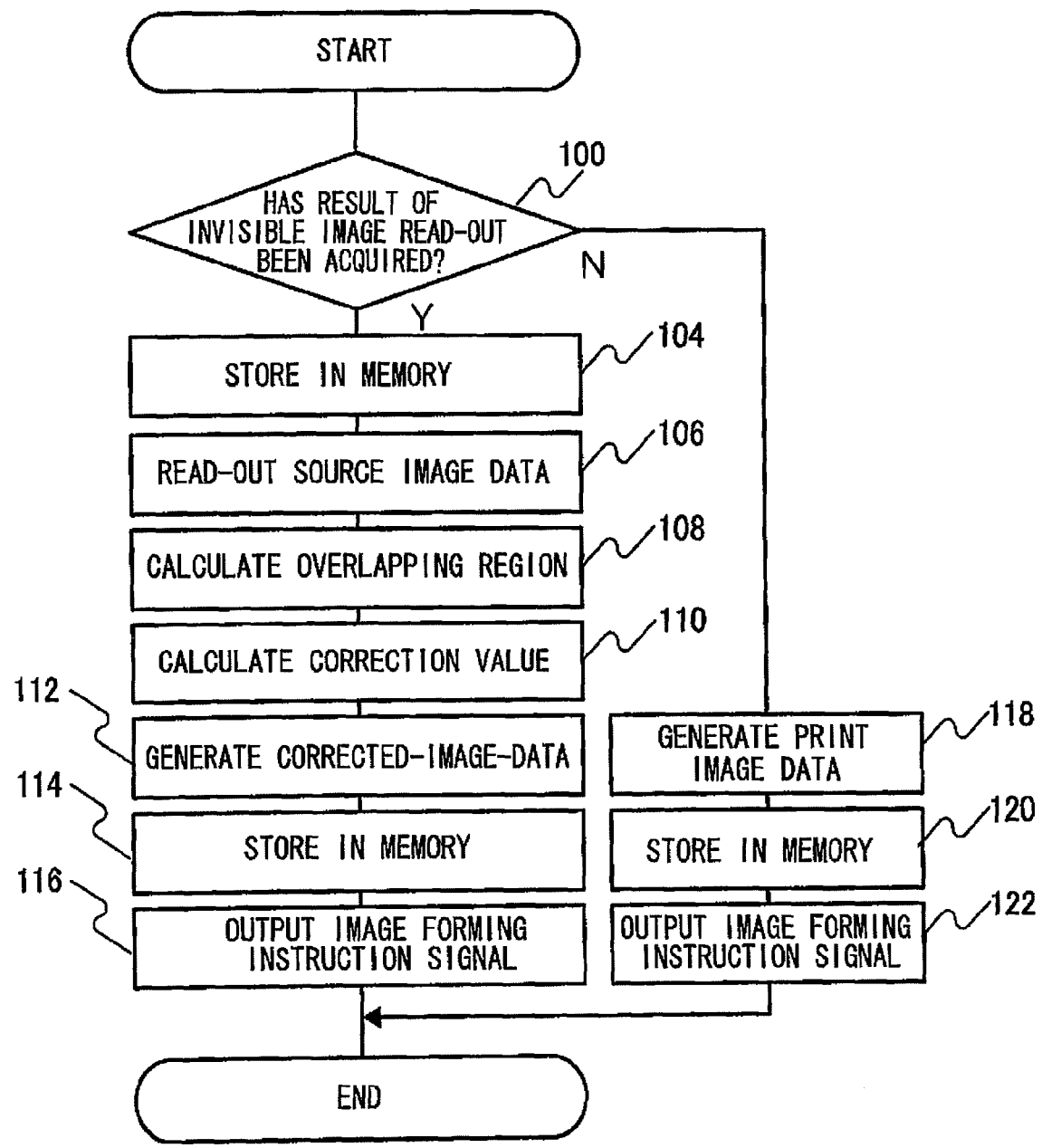
FIG. 12 is a flow chart showing processing executed in a control unit according to the first exemplary embodiment.

Power is supplied to each device unit of the multi-function device 10 by a user operating a non-illustrated power switch. When an instruction signal is received indicating that image forming on the recording medium 50 has been instructed by a user with an operating instruction of the operation unit 84, the corrected-image-data generation processing shown in FIG. 12 is executed, by the CPU 80A reading out and executing a corrected-image-data generation program stored in the HDD 80D, and image forming processing is executed.

In step 100 determination is made as to whether or not information representing an invisible image read-out result has been acquired from the invisible image read-out unit 74, and the routine proceeds to steps 118, 120 and 122 when not acquired, and present routine is ended after known print image forming processing has been executed.

It should be noted that the information representing the invisible image read-out result for determination at step 100 has been obtained by the invisible light sensor 74B in the manner explained above, and indicates the results of measurement of the absorbance of the wavelength A and wavelength B respectively, for each region on the recording medium 50 (regions corresponding to each of the pixels when an image is formed over all of the surface).

The determination at step 100 may be determined to be negative when information is not received from the invisible image read-out unit 74 indicating an invisible image read-out result within a specific period of time from after a medium detection signal has been received from the medium detection sensor 72, detecting the recording medium 50 on the intermediate transfer belt 30. However, receipt of an invisible image read-out result may be concluded if information is received from the invisible image read-out unit 74 indicating an invisible image read-out result within the specific period of time from after a medium detection signal has been received from the medium detection sensor 72, and the determination at step 100 made in the affirmative.

When step 100 is determined in the affirmative the routine proceeds to step 104, and the information received from the invisible image read-out unit 74 indicating the invisible image read-out result is stored in the HDD 80D.

At the next step 106 the source image data for the image to be recorded on the recording medium 50 is read out from the HDD 80D.

At the next step 108 any overlapping regions are calculated, which would be formed of the source image superimposed on the invisible image on the recording medium 50, by the source image of the source image data read-out in step 106 being formed on the recording medium 50 that has been formed with the invisible image corresponding to the invisible image read-out result acquired at step 100 above. This overlapping region calculation processing is based on information representing the invisible image read-out result acquired at step 100 above, and on the source image data read-out at step 106 above.

More precisely, at step 108, first the position of the invisible image on the recording medium 50 is calculated by the invisible image data recognition unit 78A from the invisible image information stored in the HDD 80D at step 104 above. The position of the source image, from forming the source image of the source image data on the recording medium 50, is then calculated by the source image data recognition unit 78B from the source image data read-out at step 106 above.

Then the overlapping region calculation unit 78C calculates any overlapping regions that would be formed by forming the source image on the recording medium 50, overlapping regions of the source image superimposed on the invisible image, calculated based on the obtained position of the invisible image on the recording medium 50, and on the position of the source image by forming the source image on the recording medium 50.

In the next step 110 correction values are derived for each pixel, for correcting the source image data such that the color and density of any overlapping regions computed in step 108 above become the color and density of corresponding regions of the source image.

More precisely, at step 110 first the absorption wavelength characteristics of the invisible coloring material used for the invisible image are obtained in the invisible image data recognition unit 78A for each pixel of the invisible image from the invisible image information stored in the HDD 80D at step 104 above. The absorption wavelength characteristics of the visible coloring materials for use in forming the source image of the source image data are obtained by the source image data recognition unit 78B from the source image data read-out in step 106 above. Correction values are then calculated in the correction value calculation unit 78D for regions of data corresponding to the overlapping regions such that the color and density of any overlapping regions computed in step 108 above becomes the color and density of corresponding regions of the source image.

In the next step 112, the processing of the corrected-image-data generation unit 78E is performed, and corrected-image-data is generated in which the source image data has been corrected based on the correction values derived at step 110 above, based on the source image data read-out at step 106 above, and based on the information indicating any overlapping regions computed at step 108. In the next step 114 the generated corrected-image-data is stored in the HDD 80D.

In the next step 116, an image formation instruction signal, including the corrected-image-data stored in step 114 above together with an instruction signal instructing image formation with the corrected-image-data, is output to the image forming device 18, and the current routine is then ended.

The image forming device 18 that has received the image formation instruction signal then forms an image of the corrected-image-data included in the received image formation instruction signal.

However, when determination is negative at step 100 above, the routine proceeds to step 118, and print image data is generated by performing color space conversion processing to convert the source image data (R, G, B color space data) stored in advance in the HDD 80D, or source image data (R, G, B color space data) received from an external device through the data input-output unit 70, into data in the C, M, Y, K color space suitable for printing on the recording medium 50 using the image forming device 18. At the next step 120, the print image data generated at step 118 above is stored in the HDD 80D.

At the next step 122, an image formation instruction signal, including the print image data stored at step 120 above, together with an instruction signal to form an image of the print image data, is output to the image forming device 18, and then the current routine is ended.

The image forming device 18 that has received the image formation instruction signal then forms an image of the print image data included in the received image formation instruction signal.

A corrected image of the corrected-image-data, in which the source image data of the source image subject to forming as an image has been corrected, is thereby formed on the recording medium 50 on which an invisible image had been formed, by executing the processing of steps 100 to 116 above. The color and density of the overlapping regions, in which the corrected image is formed on the recording medium 50 superimposed on the invisible image formed on the recording medium 50, is corrected as described above, so that in the regions corresponding to the overlapping regions the color and density of the overlapping regions becomes the color and density of the source image subject to forming on the recording medium 50. Therefore, the color and density of these overlapping regions approximates to the color and density of regions corresponding to the overlapping regions as if they were formed on the recording medium 50 on their own and not superimposed on the invisible image, thereby suppressing a reduction in the color reproducibility of the source images.

For recording medium 50 in a state in which there is no invisible image formed thereon, a visible image is formed with the source image data of the source image subject to forming converted from R, G, B color space to C, M, Y, K color space, by executing the processing of step 118 to step 122 above.

As explained above, in the multi-function device 10 of the present exemplary embodiment, correction is performed on the source image data of the source image such that the color and density of overlapping regions, in which a visible image is superimposed on an invisible image formed on the recording medium 50, visibly approximates to the color and density of colors of corresponding regions in the source image, thereby suppressing a reduction in the color reproducibility of the source images.

Explanation has been given of a case in the present exemplary embodiment in which the source image data is corrected such that both the color and density of the above overlapping regions approximates to the color and density of corresponding regions in the source image, however there is no limitation to both color and density, as long as correction of the source image data is performed such that the color of the overlapping regions approximates to the color of corresponding regions in the source image.

Explanation has also been given of a case in the present exemplary embodiment in which the recording medium 50 is the recording medium 50 with an invisible image formed in advance thereon by image forming processing, however the multi-function device 10 may be a device configured to also include a device for forming an invisible image on a recording medium 16, prior to image forming processing with the image forming device 18 of the multi-function device 10. In such cases, for example, configuration may be made with an image forming unit (not shown in the diagrams), for image forming with an invisible toner including an invisible coloring material, provided upstream of the image forming unit 20, upstream in the rotation direction of the intermediate transfer belt 30.

Second Exemplary Embodiment

Explanation has been given in the above first exemplary embodiment of the image forming device 18 of the multi-function device 10 forming a visible image on the recording medium 50 that has been formed with an invisible image. However, explanation will now be given of a case in the present exemplary embodiment in which an image is read in from a recording medium 16, on which both an invisible image and a visible image have been formed, using a scanner unit 12 of a multi-function device 11 that is additionally provided with the scanner unit 12.

Figure 13:
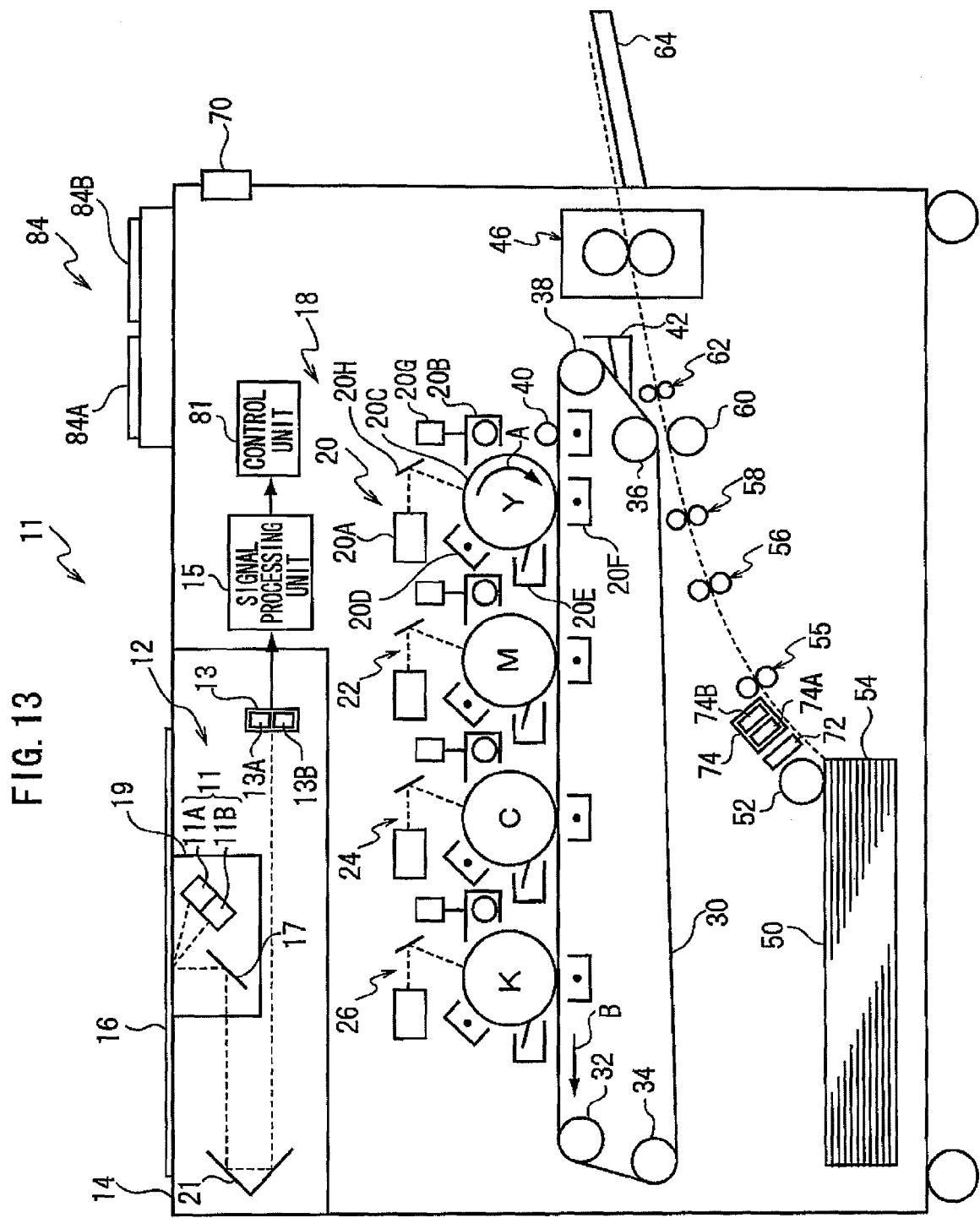
FIG. 13 is a schematic configuration diagram of a multi-function device according to a second exemplary embodiment.

The multi-function device 11 of the present exemplary embodiment, as shown in FIG. 13, is provided with the scanner unit 12, a control unit 81, the image forming device 18, the data input-output unit 70 and the operation unit 84. The multi-function device 11 is configured similarly to the multi-function device 10 of the first exemplary embodiment, except in that the control unit 81 is provided in place of the control unit 80 of the multi-function device 10 explained in the first exemplary embodiment, and in that the scanner unit 12 is additionally provided. Therefore similar parts of the configuration to those of the first exemplary embodiment are allocated the same reference numerals and explanation thereof is omitted. The multi-function device 11 corresponds to the image forming device of the present invention.

The scanner unit 12 reads in both a source image and an invisible image on a recording medium 16 placed at a specific position on a platen glass 14.

It should be noted that in the present exemplary embodiment explanation will be given where the source image is one formed on the recording medium 16, to be read in by the scanner unit 12, and indicates a visible image formed using visible coloring materials as explained in the first exemplary embodiment. Also, in the present exemplary embodiment, the invisible image indicates an image formed in advance on the recording medium 16, using invisible coloring materials as explained in the first exemplary embodiment.

The scanner unit 12 reads in the visible image by partitioning the source image into plural individual pixels and decomposing the image into R, G, B using a color CCD sensor 13A. The scanner unit 12 reads in the invisible image using an invisible light sensor 13B.

Specifically, the scanner unit 12 is configured to include: a light source 1, for irradiating light onto the recording medium 16 placed on the platen glass 14; carriage 19, inbuilt with the light source 1 and a mirror 17 extending along the width direction of the recording medium; and a light receiving unit 13 for receiving light irradiated from the light source 1 as reflected light from the mirror 17. The light receiving unit 13 is configured to include the color CCD sensor 13A and the invisible light sensor 13B.

The light source 1 is provided with a light source 1A, for irradiating light in the visible region (sometimes referred to below as visible light) onto the recording medium 16 on the platen glass 14, and a light source 1B for irradiating light in an invisible region (sometimes referred to below as invisible light) onto the recording medium 16 on the platen glass 14. The visible light irradiated from the light source 1A is reflected by the recording medium 16 placed on the platen glass 14 and by the mirror 17, is further reflected by a mirror 21 and then received by the color CCD sensor 13A. The invisible light irradiated from the light source 1B is reflected by the recording medium 16 placed on the platen glass 14 and by the mirror 17, is further reflected by a mirror 21 and then received by the invisible light sensor 13B.

In the present exemplary embodiment the light source 1B is configured similarly to the light source 74A explained in the first exemplary embodiment, and irradiates light of at least two mutually different preset wavelengths each within an invisible region. The invisible light sensor 13B is configure similarly to the invisible light sensor 74B explained in the first exemplary embodiment, and is provided with capability to measure the absorbance of each of these two wavelengths. More detailed explanation of these two wavelengths will be omitted since explanation has been given in the first exemplary embodiment, and these two wavelengths are pre-defined as wavelength A and wavelength B, as in the first exemplary embodiment.

The scanner unit 12 is also provided with a signal processing unit 15, and a color image signal output from the color CCD sensor 13A is converted into digital color image data by the signal processing unit 15 and output as source image data to the control unit 81. In a similar manner, an invisible image signal output from the invisible light sensor 13B is converted into digital data by the signal processing unit 15 and output as invisible image data to the control unit 81.

Figure 14:
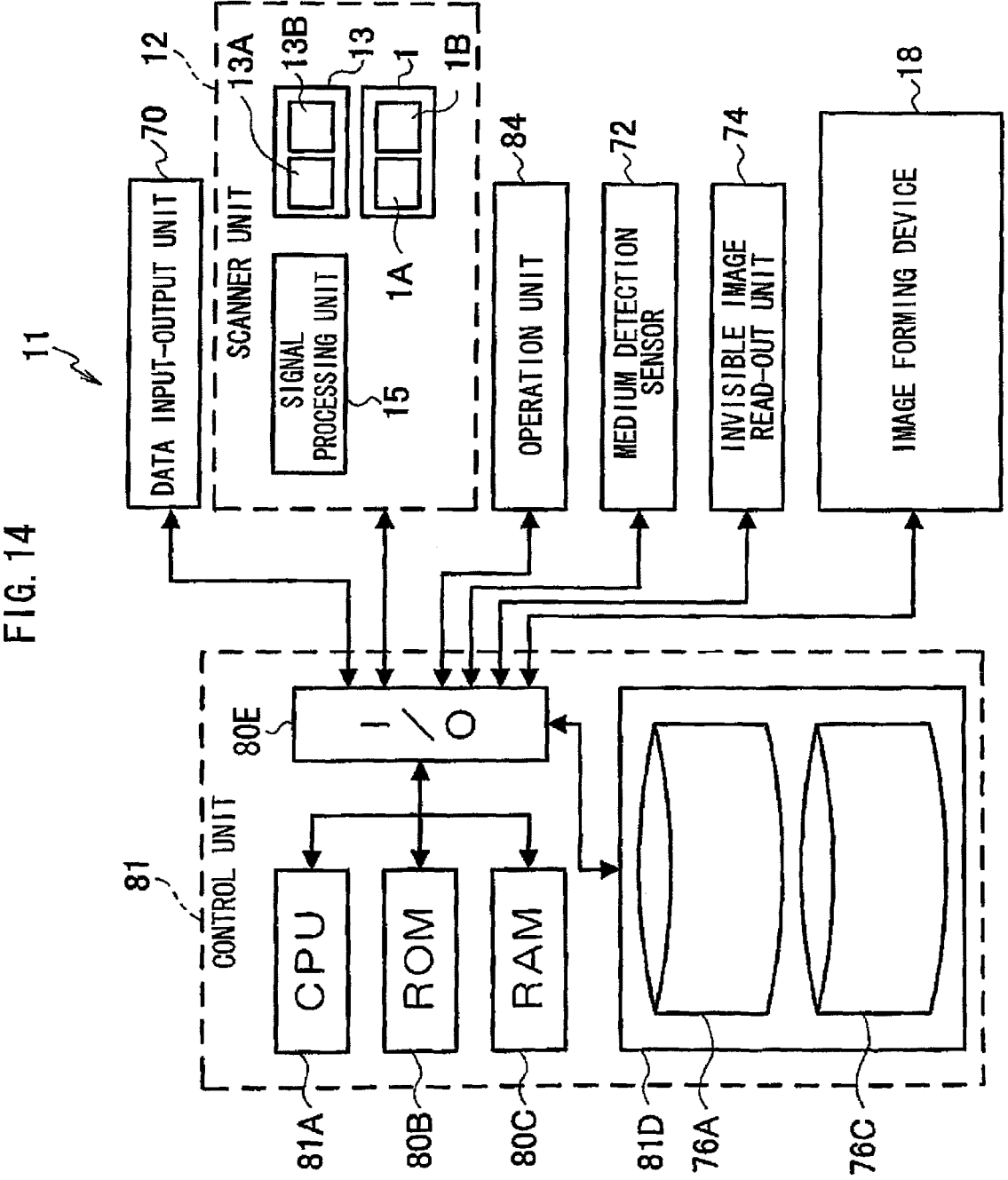
FIG. 14 is a schematic block diagram showing an electrical configuration of a multi-function device according to the second exemplary embodiment.

The control unit 81 is configured to include, as shown in FIG. 14, a CPU 81A, ROM 80B, RAM 80C, I/O 80E, and HDD 81D.

These CPU 81A, ROM 80B, RAM 80C, I/O 80E and HDD 81D are mutually connected so as to be able to send and receive signals between each other. The control unit 81 is connected so as to be able to send and receive signals to the data input-output unit 70, scanner unit 12, operation unit 84, medium detection sensor 72, invisible image read-out unit 74, and image forming device 18.

The HDD 81D is configured, in a similar manner to the HDD 80D explained in the first exemplary embodiment, to include an invisible image table 76A, correction table 76B, and source image color table 76C. Differences between the HDD 81D and the HDD 80D are that a read-in image correction program is stored in the HDD 81D, in addition to the various data and programs stored in the HDD 80D. This read-in image correction program is a program executed by the CPU 81A to perform corrected-image-data generation processing to generate corrected-image-data of corrected source image data of the source image to be read in by the scanner unit 12.

Figure 15:
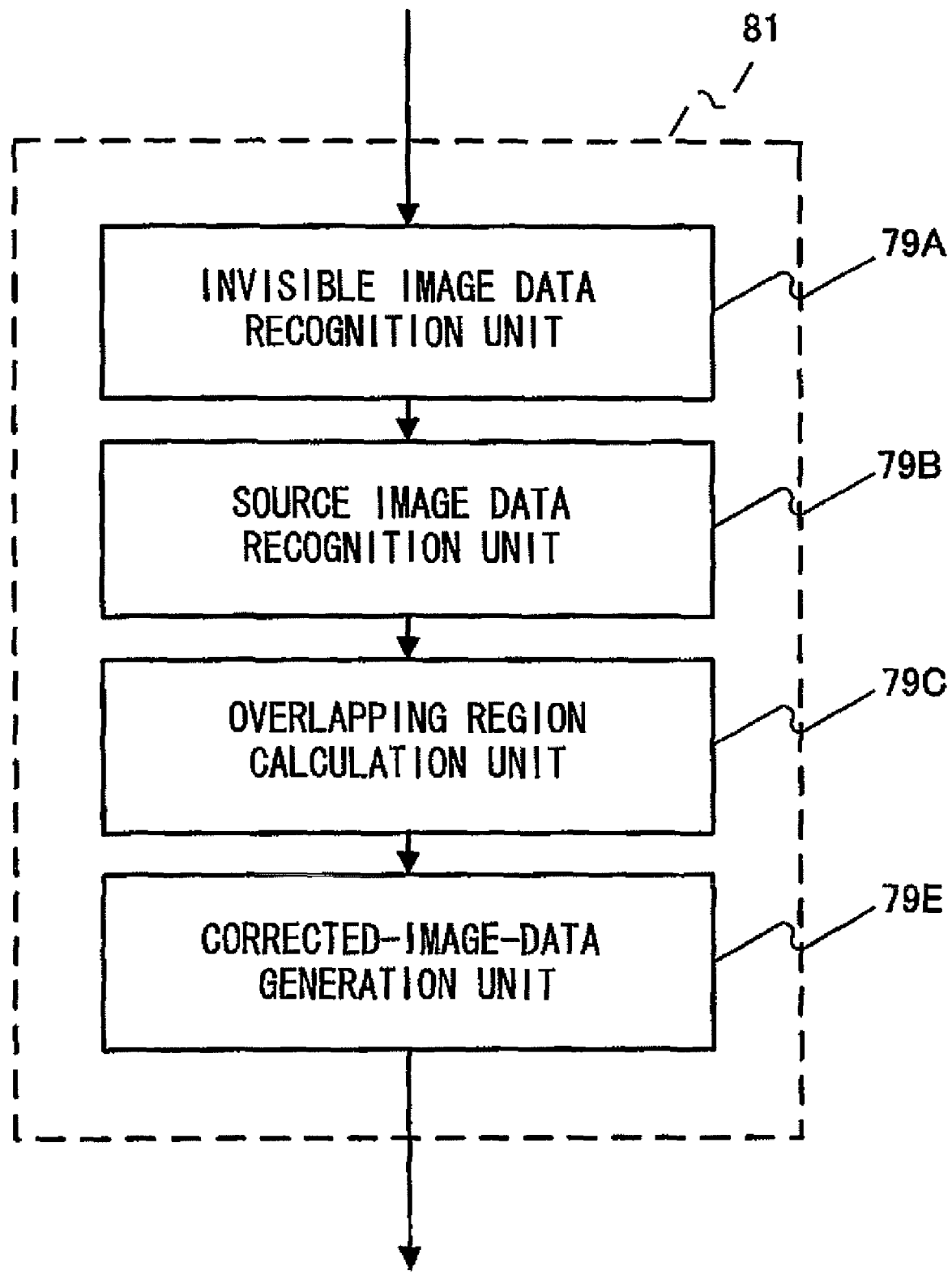
FIG. 15 is a schematic functional block diagram showing the functionality of a control unit according to the second exemplary embodiment.

The CPU 81A is configured, as shown in FIG. 15, to included an invisible image data recognition unit 79A, a source image data recognition unit 79B, an overlapping region calculation unit 79C, and a corrected-image-data generation unit 79E.

The invisible image data recognition unit 79A is a functional unit for recognizing the position of invisible images on the recording medium 16 and for recognizing the absorption wavelength characteristics of the invisible coloring materials used for the invisible images. The source image data recognition unit 79B is a functional unit for recognizing the position of source images that are formed on the recording medium 16 and recognizing the absorption wavelength characteristics of the visible coloring materials used for forming the source images. The overlapping region calculation unit 79C is a functional unit for calculating any overlapping regions on the recording medium 16 where an invisible image formed on the recording medium 16 is superimposed with a source image formed on the same recording medium 16. The corrected-image-data generation unit 79E is a functional unit that generates corrected-image-data in which the source image data has been corrected.

Explanation will now be given of details of the function of each of the functional units.

The invisible image data recognition unit 79A obtains the absorption wavelength characteristics of the invisible coloring materials used in the invisible images, from the absorbance, measured by the invisible light sensor 13B, of two wavelengths (wavelength A and wavelength B) that have been irradiated onto the invisible images, and computes the position of the invisible images on the recording medium 16.

More precisely the invisible image data recognition unit 79A reads out, from the invisible image table 76A, the absorption wavelength characteristics of the invisible coloring materials that both corresponds to the ratio of the absorbance, measured by the invisible light sensor 13B, of two wavelengths (wavelength A and wavelength B) that have been irradiated onto the invisible images, and the absorbance of the wavelength A, obtaining the absorption wavelength characteristics of the invisible coloring materials.

The position of the invisible images on the recording medium 16 may, for example, be calculated by: partitioning the total region on the recording medium 16 into plural regions such that regions with light absorption ratios within a few % of each other are grouped so as to belong to a group of regions, based on the measurement results of the absorbance for the whole region of the recording medium 16 read out by the invisible light sensor 13B, and using the boundaries between these regions for the position of the invisible images.

The invisible light sensor 13B may read out information representing the absorbance of each region from plural pre-partitioned regions corresponding to each pixel of visible image formed using visible coloring materials on the recording medium 16. Therefore the disposition and size etc. of sensors of the invisible light sensor 13B can be adjusted in advance.

The source image data recognition unit 79B obtains the absorption wavelength characteristics of the visible coloring materials used for forming the source images from the source image data of the source image formed on the recording medium 16, and also calculates the position where the source image is formed on the recording medium 16.

More precisely, the source image data recognition unit 79B performs color space conversion processing for converting source image data (data in R, G, B color space) obtained by the color CCD sensor 13A into data in C, M, Y, K color space appropriate for printing on the recording medium 50 with the image forming device 18. Such color space conversion processing may be performed, for example, by direct conversion of the data in R, G, B color space into C, M, Y, K color space using a DLUT, or may be performed by first performing conversion of R, G, B color space data into C, M, Y, K color space data using a DLUT and then using UCR (Under Color Removal) processing using a single dimension LUT on the converted C, M, Y, K color space data.

Information is read out representing the color and density and the position on the recording medium 16 of each pixel of the source image, included in the converted source image data. The position of the source image on the recording medium 16 is derived by reading out the position of each of the pixels of the source image (the position of each of the pixels configuring the source image) from the source image data.

The absorption wavelength characteristics of the visible coloring materials used for forming the source image is obtained by reading out from the source image color table 76C the absorption wavelength characteristics of the visible coloring materials corresponding to the color and density of each of the pixels of the source images included in the converted source image data.

The overlapping region calculation unit 79C computes the overlapping regions on the recording medium 16 where the invisible image formed on the recording medium 16 is superimposed with the source image formed on the recording medium 16. This computation, for example, may be by computing the regions where the source image and the invisible image are superimposed on the recording medium 16, based on the position of the invisible image on the recording medium 16 and the position of the source image on the recording medium 16, obtained respectively from the above invisible image data recognition unit 79A and from the source image data recognition unit 79B.

The corrected-image-data generation unit 79E generates corrected-image-data for regions corresponding to overlapping regions within the source image data, with the absorption wavelength components of the invisible coloring materials removed from the data, so that in the overlapping regions calculated by the overlapping region calculation unit 79C the wavelength components of the invisible coloring materials used in the invisible images are removed.

For example, for those absorption wavelength characteristics of visible coloring materials used to form each of the pixels of a source image recognized by the source image data recognition unit 79B that are absorption wavelength characteristics of the source image for regions corresponding to the overlapping regions computed by the overlapping region calculation unit 79C, the corrected-image-data generation unit 79E generates corrected-image-data by removing from each of the corresponding pixels the absorption wavelength characteristics of the invisible coloring material used in each of the pixels of the invisible image. The corrected-image-data generation unit 79E uses the absorption wavelength characteristics of the invisible coloring material obtained by the above invisible image data recognition unit 79A for the absorption wavelength characteristics of the invisible coloring material used in each of the pixels of the invisible image.

Explanation will now be given of the multi-function device 11 reading out the visible image and the invisible image formed on the recording medium 16, and the processing executed in the CPU 81A as processing for forming an image on the recording medium 50.

Figure 16:
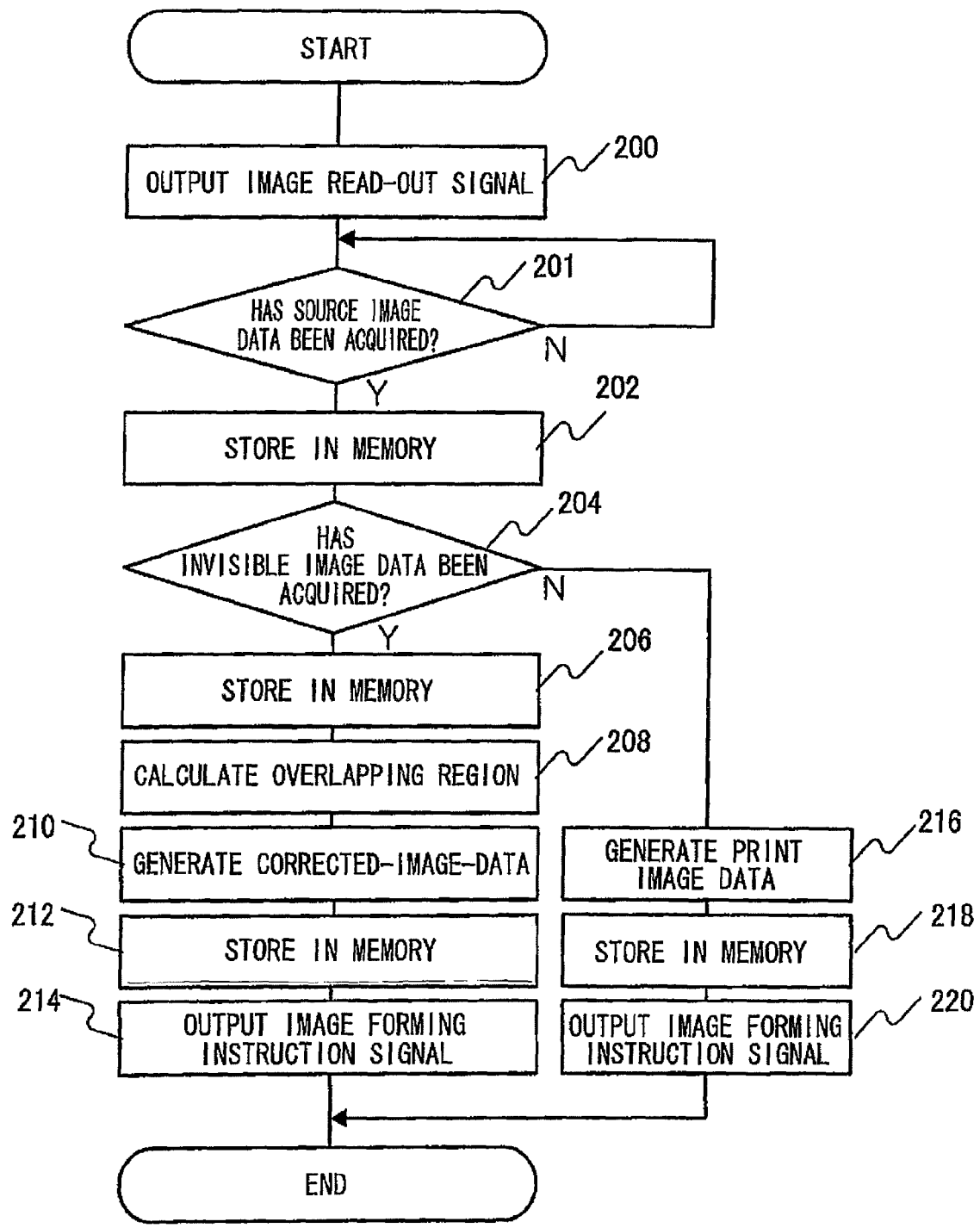
FIG. 16 is a flow chart showing processing executed in a control unit according to the second exemplary embodiment.

Power is supplied to each device unit of the multi-function device 11 by a user operating a non-illustrated power switch. When an instruction signal is input, indicating that reading in of images formed on the recording medium 16 using the scanner unit 12 has been instructed by the an operation instruction of the operation unit 84, the processing shown in FIG. 16 is executed in the CPU 81A by executing of a read-out image correction program stored in the 81D.

In step 200, an instruction signal is output to the color CCD sensor 13A and the invisible light sensor 13B to instruct respective reading out of source images and invisible images formed on the recording medium 16. The color CCD sensor 13A, in receipt of the read-out instruction signal, reads-out the source image from the recording medium 16 placed on the platen glass 14, and outputs the read-out data to the CPU 81A. The color CCD sensor 13B, in receipt of the read-out instruction signal, reads-out the invisible image from the recording medium 16 placed on the platen glass 14, and outputs the read-out data to the CPU 81A.

The next step 201 is repeated with a negative determination until source image data is acquired from the color CCD sensor 13A, when determination is affirmative and the routine proceeds to step 202. In the next step 202 the acquired source image data is stored in the HDD 81D.

At the next step 204 determination is made as to whether or not invisible image data result has been acquired from the invisible light sensor 13B, and the routine proceeds to step 206 when affirmative, and the acquired invisible image data is stored in the HDD 81D.

For the determination at step 204, for example, affirmative determination may be made that there is an invisible image formed on the recording medium 16 when invisible image data is acquired from the invisible light sensor 13B within a specific period of time from an affirmative determination at step 201 above. Negative determination may be made, that there is no invisible image formed on the recording medium 16, no invisible image data is acquired from the invisible light sensor 13B within the specific period of time.

At the next step 208 overlapping region calculation processing is performed by the overlapping region calculation unit 79C and overlapping regions of source image and invisible image on the recording medium 16 are calculated.

At the next step 210 processing is performed by the corrected-image-data generation unit 79E and corrected-image-data is generated by removing the absorption wavelength components of the invisible coloring materials from data in the source image data of regions corresponding to the overlapping regions. This is performed using the overlapping regions computed at step 116 above, the source image data stored in the HDD 81D at step 202 above, and the invisible image data stored in the HDD 81D at step 206 above. This is performed such that in the overlapping regions of the invisible image and the source image formed on the recording medium 16, the absorption wavelength components of the invisible coloring materials used in the invisible image are removed from the corrected data for the overlapping regions. At the next step 212 the generated corrected-image-data is stored in the HDD 81D.

At the next step 214 an image formation instruction signal, including the corrected-image-data stored at step 212 together with an instruction signal instructing formation of an image of the corrected-image-data, is output to the image forming device 18, and the current routine is then ended.

The image forming device 18 that has received the image formation instruction signal then forms an image of the corrected-image-data included in the received image formation instruction signal.

However, when determination is negative at step 204 above, the routine proceeds to step 216, and print image data for printing is generated by performing color space conversion processing to convert the source image data in RGB color space acquired from the color CCD sensor 13A into source image data in CMYK color space, and this print image data is stored in the HDD 81D at the next step 218. At the next step 220, an image formation instruction signal, including the print image data stored in the HDD 81D at step 218 together with an instruction signal to form an image of the print image data, is output to the image forming device 18, and then the current routine is ended.

The image forming device 18 that has received the image formation instruction signal then forms an image of the print image data included in the received image formation instruction signal.

By execution of the processing of step 200 to step 214 above, both the invisible image and the source image are read out from the recording medium 16, formed with the invisible image and source image, corrected-image-data is generated in which the absorption wavelength components due to the invisible image are removed from the source image data of the source image for overlapping regions where the invisible image and the source image are superimposed, and a corrected image of the corrected-image-data is formed on the recording medium 50.

Therefore, by removing the absorption wavelength components of the invisible image from the read-out source image a reduction in color reproducibility of the source image formed on the recording medium 16 when forming the source image on the recording medium 50 is suppressed, even when there is an invisible image included in the source image read out from the recording medium 16 by the scanner unit 12.

For recording medium 16 in a state in which there is no invisible image formed thereon, an image is formed on the recording medium 50 with the source image data of the read-out source image converted from RGB color space to CMYK color space, by executing the processing of step 216 to step 220 above.

As explained above, the multi-function device 11 of the present exemplary embodiment suppresses a reduction in color reproducibility of a source image, even when both an invisible image and the source image are formed on the recording medium 16 read out by the scanner unit 12, by forming a corrected image on the recording medium 50 with the absorption wavelength components of the invisible image removed from the read-out image.

It should be noted that explanation of the multi-function device 11 of the present exemplary embodiment has been given in a case where the source image read-out from the recording medium 16 is formed on the recording medium 50 by the image forming device 18, however the corrected-image-data stored in the HDD 81D at step 212 above may be transmitted to an external device through the data input-output unit 70.

It should be noted that explanation of the multi-function device 11 of the present exemplary embodiment has been given in a case where the source image read-out from the recording medium 16 is formed on the recording medium 50 by the image forming device 18, however image correction processing, such as that explained in the first exemplary embodiment, may be additionally performed when the source image read-out from the recording medium 16 is being formed on the recording medium 50 by the image forming device 18. In such cases the processing routine shown in FIG. 12 for the first exemplary embodiment may be executed with the corrected-image-data stored in the HDD 81D at step 212 of the second exemplary embodiment as the source image data for the processing routine.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
an acquiring unit that acquires invisible image data of an invisible image subject to forming on a recording medium with invisible coloring material having absorption wavelength characteristics wherein light within visible wavelengths is at least partially absorbed,
wherein the acquiring unit acquires source image data of a source image subject to forming on the recording medium with visible coloring material;
an overlapping region calculating unit that calculates an overlapping region of an image of the invisible data and an image of the source image data; and
a generating unit that generates corrected-image-data of a pixel within the overlapping region of the source image data corrected according to the absorption wavelength characteristics, such that a color of the pixel within the overlapping region, where both a pixel of the invisible image and a pixel of the source image are superimposed when formed on the recording medium, is at least nearly an identical color to a color of the pixel of the source image within a region corresponding to the overlapping region.

2. An image forming device comprising:
an overlapping region calculating unit that calculates an overlapping region of an image of invisible image data and an image of source image data, the invisible image being subject to forming on a recording medium with invisible coloring material having absorption wavelength characteristics wherein light within visible wavelengths is at least partially absorbed;
a generating unit that generates corrected-image-data of a pixel within the overlapping region of the source image data of a source image corrected according to the absorption wavelength characteristics, such that a color of the pixel within the overlapping region, where both a pixel of the invisible image subject to forming on the recording medium with the invisible coloring material and a pixel of the source image subject to forming on the recording medium with visible coloring material, are superimposed when formed on the recording medium, is at least nearly an identical color to a color of the pixel of the source image within a region corresponding to the overlapping region; and
an image forming unit that forms on the recording medium a corrected image of the corrected-image-data with the visible coloring material, based on the corrected-image-data generated by the generating unit, the invisible image with the invisible coloring material being formed on the recording medium.

3. An image forming device comprising:
an acquiring unit that acquires invisible image data of an invisible image formed in advance on a recording medium with invisible coloring material and acquires absorption wavelength characteristics of the invisible coloring material;
a generating unit that generates corrected-image-data of source image data corrected according to the absorption wavelength characteristics of the invisible coloring material acquired by the acquiring unit, such that a color of an overlapping region, where both the invisible image and the source image subject to forming on the recording medium with visible coloring material are superimposed when formed on a recording medium, is at least nearly an identical color to a color of a region corresponding to the overlapping region in the source image; and
an image forming unit that forms a corrected image of the corrected-image-data with visible coloring material on the recording medium, based on the corrected-image-data generated by the generating unit.

4. The image forming device of claim 3, wherein the acquiring unit further acquires density information of the invisible image, and the generating unit generates corrected-image-data of the source image data corrected according to the absorption wavelength characteristics and the density information acquired by the acquiring unit.

5. The image forming device of claim 3, wherein:
the acquiring unit comprises:
an irradiating unit that irradiates light of a wavelength in an invisible region onto the recording medium,
a measuring unit that receives reflected light from refection of the light irradiated from the irradiating unit and measures absorbance at the wavelength in the invisible region of the invisible coloring material based on the reflected light, and
a storage unit that pre-stores absorbance information representing the absorbance at the wavelength in the invisible region, and absorption wavelength characteristics of invisible coloring materials; and
the generating unit generates the corrected-image-data based on the absorption wavelength characteristics corresponding to the absorbance information of the absorbance measured by the measuring unit and stored in the storage unit.

6. The image forming device of claim 5, wherein the irradiating unit irradiates light of at least two mutually different preset wavelengths each within an invisible region, and the storage unit stores a ratio of absorbance of the at least two wavelengths as the absorbance information.

7. The image forming device of claim 6, wherein the storage unit further stores as the absorbance information the absorbance of at least one wavelength from among the light of the at least two wavelengths.

8. An image forming device comprising:

an acquiring unit that acquires source image data of a source image formed in advance on a recording medium with visible coloring material, that acquires invisible image data of an invisible image formed in advance on the recording medium with invisible coloring material, and that acquires absorption wavelength characteristics of the invisible coloring material;

a generating unit that generates corrected-image-data of source image data corrected by removing absorption wavelength components due to the invisible image from the source image data at an overlapping region where the invisible image and the source image are superimposed on the recording medium, based on the source image data, the invisible image data, and the absorption wavelength characteristics acquired by the acquiring unit; and an image forming unit that forms a corrected image of the corrected-image-data with the visible coloring material on the recording medium, based on the corrected-image-data generated by the generating unit.

9. The image forming device of claim 8, wherein:

the acquiring unit comprises an irradiating unit that irradiates light of a wavelength in an invisible region onto the recording medium, a measuring unit that receives reflected light from refection of the light irradiated from the irradiating unit and measures the absorbance at the wavelength in the invisible region of the invisible coloring material, based on the reflected light, and a storage unit that pre-stores absorbance information representing the absorbance at the wavelengths in the invisible region, and absorption wavelength characteristics of invisible coloring materials; and the generating unit generates the corrected-image-data, based on the absorption wavelength characteristics corresponding to the absorbance information of the absorbance measured by the measuring unit and stored in the storage unit.

10. The image forming device of claim 9, wherein the irradiating unit irradiates light of at least two mutually different preset wavelengths each within an invisible region, and the storage unit stores a ratio of absorbance of the at least two wavelengths as the absorbance information.

11. The image forming device of claim 10, wherein the storage unit further stores as the absorbance information the absorbance of at least one wavelength from the light of at least two wavelengths.

* * * * *